(12) United States Patent
Lee et al.

(10) Patent No.: US 11,393,483 B2
(45) Date of Patent: Jul. 19, 2022

(54) METHOD FOR TRANSMITTING AND RECEIVING AUDIO DATA AND APPARATUS THEREFOR

(71) Applicant: LG ELECTRONICS INC., Seoul (KR)

(72) Inventors: Tungchin Lee, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/963,132

(22) PCT Filed: Jan. 25, 2019

(86) PCT No.: PCT/KR2019/001093
§ 371 (c)(1),
(2) Date: Jul. 17, 2020

(87) PCT Pub. No.: WO2019/147064
PCT Pub. Date: Aug. 1, 2019

(65) Prior Publication Data
US 2021/0050028 A1 Feb. 18, 2021

Related U.S. Application Data

(60) Provisional application No. 62/622,155, filed on Jan. 26, 2018.

(51) Int. Cl.
*G10L 19/16* (2013.01)
*H04S 5/00* (2006.01)
*H04S 7/00* (2006.01)

(52) U.S. Cl.
CPC .............. *G10L 19/16* (2013.01); *H04S 5/005* (2013.01); *H04S 7/305* (2013.01)

(58) Field of Classification Search
None
See application file for complete search history.

(56) References Cited

U.S. PATENT DOCUMENTS

| 9,728,181 B2 | 8/2017 | Jot et al. | |
| 2011/0081023 A1* | 4/2011 | Raghuvanshi | H04S 7/30 381/17 |
| 2013/0101122 A1 | 4/2013 | Yoo et al. | |
| 2017/0223478 A1 | 8/2017 | Jot et al. | |
| 2018/0197551 A1* | 7/2018 | McDowell | H04S 7/30 |
| 2019/0174246 A1* | 6/2019 | De Bruijn | A63F 13/54 |

FOREIGN PATENT DOCUMENTS

| KR | 10-1715541 B1 | 3/2017 |
| KR | 10-1805212 B1 | 12/2017 |

* cited by examiner

*Primary Examiner* — Kenny H Truong
(74) *Attorney, Agent, or Firm* — Dentons US LLP

(57) ABSTRACT

A method for transmitting audio data performed by an audio data transmission apparatus in accordance with the present invention comprises the steps of: generating playback environment information of three-dimensional audio content; encoding a three-dimensional audio signal of the three-dimensional audio content; and transmitting, to an audio data reception apparatus, the encoded three-dimensional audio signal of the three-dimensional audio content and the generated playback environment information, wherein the playback environment information includes environment information of a room in which the three-dimensional audio content is played.

19 Claims, 23 Drawing Sheets

(a)

(b)

(c)

METHOD FOR TRANSMITTING AND RECEIVING AUDIO DATA AND APPARATUS THEREFOR

This application is a National Stage Application of International Application No. PCT/KR2019/001093, filed on Jan. 25, 2019, which claims the benefit of and priority to U.S. Provisional Application No. 62/622,155, filed on Jan. 26, 2018, which are hereby incorporated by reference in their entirety for all purposes as if fully set forth herein.

TECHNICAL FIELD

The present disclosure relates to audio data, and more particularly, to a method and apparatus for transmitting and receiving three-dimensional audio data.

BACKGROUND ART

A virtual reality (VR) system gives the user a sense of being in an electronically projected environment. An augmented reality (AR) system arranges a 3D virtual image on a real image or a background in an overlapping manner to provide the user with a sense of being in a mixed environment of virtuality and reality. The system for providing VR or AR may be further improved to provide higher quality images and stereophonic sound. A VR or AR system may allow a user to interactively consume VR or AR content.

With the increasing demand for VR or AR content, there is an increasing need for a method for efficiently transmitting and receiving audio data between a device configured to generate an audio signal for playing VR or AR content and a device configured to play the VR or AR content.

DISCLOSURE

Technical Problem

An object of the present disclosure is to provide a method and apparatus for transmitting and receiving audio data.

Another object of the present disclosure is to provide an audio data transmission apparatus for generating playback environment information for audio content and transmitting the same to an audio data reception apparatus, and an operation method therefor.

Another object of the present disclosure is to provide an audio data reception apparatus for receiving playback environment information for audio content from an audio data transmission apparatus, and an operation method therefor.

Another object of the present disclosure is to provide a method and apparatus for transmitting and receiving 3D audio data.

Another object of the present disclosure is to provide an audio data transmission apparatus for generating playback environment information for 3D audio content and transmitting the same to an audio data reception apparatus, and an operation method therefor.

Another object of the present disclosure is to provide an audio data reception apparatus for receiving playback environment information for 3D audio content from an audio data transmission apparatus and rendering an audio signal, and an operation method therefor.

Another object of the present disclosure is to provide playback environment information for 6 DoF audio content based on the Audio Definition Model (ADM) of ITU-R.

Technical Solution

In one aspect of the present disclosure, provided herein is a method for transmitting audio data by an audio data transmission apparatus. The method may include generating playback environment information for three-dimensional (3D) audio content, encoding a 3D audio signal of the 3D audio content, and transmitting the encoded 3D audio signal of the 3D audio content and the generated playback environment information to an audio data reception apparatus, wherein the playback environment information may include room environment information for playing the 3D audio content.

In another aspect of the present disclosure, provided herein is an audio data transmission apparatus for transmitting audio data. The audio data transmission apparatus may include a metadata generator configured to generate playback environment information for 3D audio content, an audio signal encoder configured to encode a 3D audio signal of the 3D audio content, and a transmitter configured to transmit the encoded 3D audio signal of the 3D audio content and the generated playback environment information to an audio data reception apparatus, wherein the playback environment information may include room environment information for playing the 3D audio content.

In another aspect of the present disclosure, provided herein is a method for receiving audio data by an audio data reception apparatus. The method may include receiving playback environment information for 3D audio content and an encoded 3D audio signal of the 3D audio content from an audio data transmission apparatus, decoding the encoded 3D audio signal, and rendering the decoded 3D audio signal based on the playback environment information for the 3D audio content, wherein the playback environment information may include room environment information for playing the 3D audio content.

In another aspect of the present disclosure, provided herein is an audio data reception apparatus for receiving audio data. The audio data reception may include a receiver configured to receive playback environment information for 3D audio content and an encoded 3D audio signal of the 3D audio content from an audio data transmission apparatus, an audio signal decoder configured to decode the encoded 3D audio signal, and a renderer configured to render the decoded 3D audio signal based on the playback environment information for the 3D audio content, wherein the playback environment information may include room environment information for playing the 3D audio content.

Advantageous Effects

In accordance with the present disclosure, an audio data transmission apparatus and an audio data reception apparatus may efficiently transmit and receive audio data about 3D audio content.

In accordance with the present disclosure, an audio data transmission apparatus and an audio data reception apparatus may efficiently transmit and receive audio data about VR or AR content.

In accordance with the present disclosure, an audio data reception apparatus may more efficiently play 3D audio content received from an audio data transmission apparatus based on playback environment information for the 3D audio content.

In accordance with the present disclosure, an audio data reception apparatus may more efficiently render (or play) a 3D audio signal for VR or AR content received from an audio data transmission apparatus based on playback environment information for the VR or AR content.

BEST MODE

Figure 1:
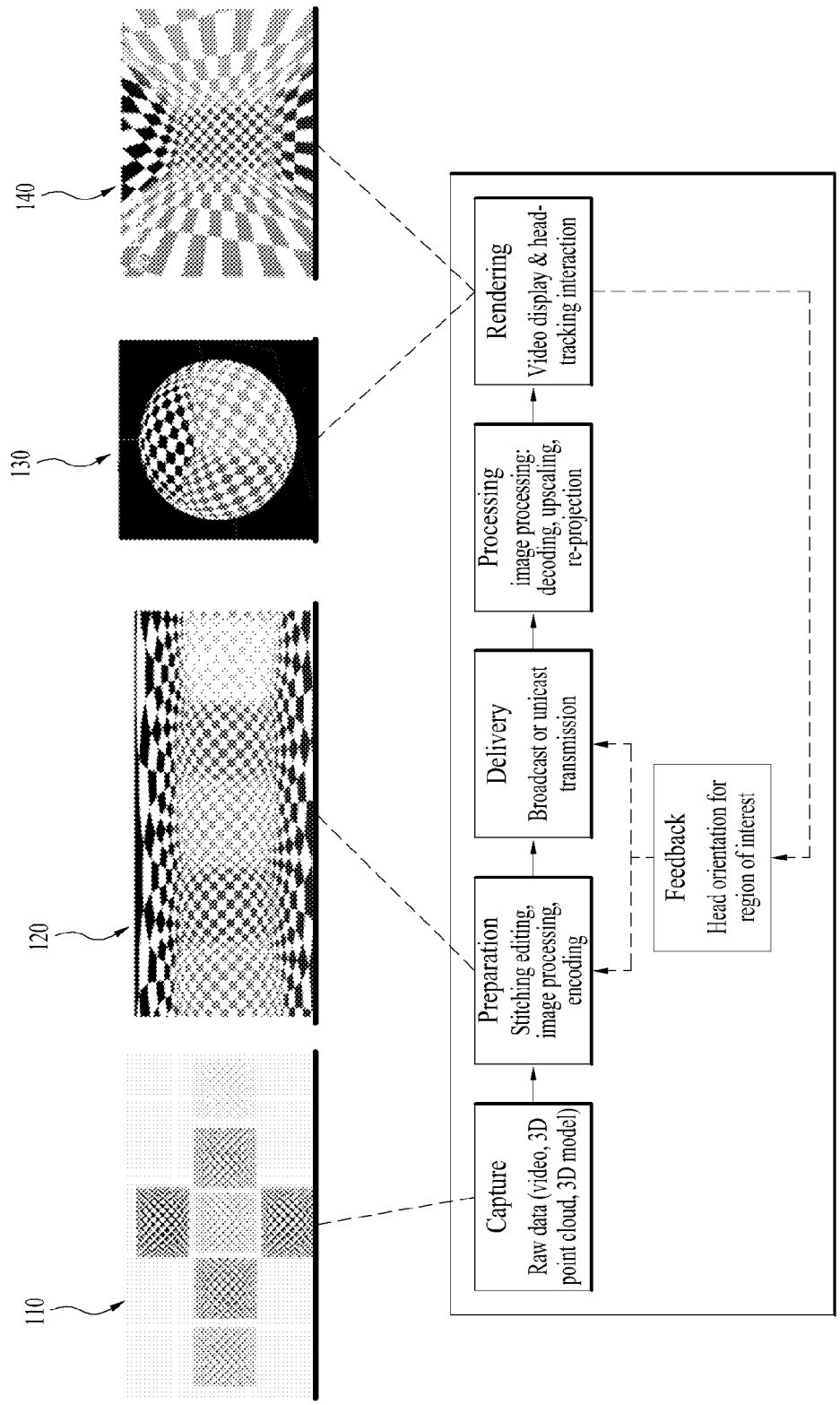
FIG. 1 is a diagram showing an overall architecture for providing 360 content in accordance with some embodiments.

In accordance with some embodiments of the present disclosure, provided herein is a method for transmitting audio data by an audio data transmission apparatus. The method may include generating playback environment information for three-dimensional (3D) audio content, encoding a 3D audio signal of the 3D audio content, and transmitting the encoded 3D audio signal of the 3D audio content and the generated playback environment information to an audio data reception apparatus, wherein the playback environment information may include room environment information for playing the 3D audio content.

[Mode]

The present disclosure may be subjected to various changes and may have various embodiments, and specific embodiments will be described in detail with reference to the accompanying drawings. However, this is not intended to limit the disclosure to the specific embodiments. Terms used in this specification are merely adopted to explain specific embodiments, and are not intended to limit the technical spirit of the present disclosure. A singular expression includes a plural expression unless the context clearly indicates otherwise. In this specification, the term "include" or "have" is intended to indicate that characteristics, figures, steps, operations, constituents, and elements disclosed in the specification or combinations thereof exist, and should be understood as not precluding the existence or addition of one or more other characteristics, figures, steps, operations, constituents, elements, or combinations thereof.

Though individual elements described in the present disclosure are independently shown in the drawings for convenience of description of different functions, this does not mean that the elements are implemented in hardware or software elements separate from each other. For example, two or more of the elements may be combined to form one element, or one element may be divided into a plurality of elements. Embodiments in which respective elements are integrated and/or separated are also within the scope of the present disclosure without departing from the essence of the present disclosure.

Hereinafter, exemplary embodiments of the present disclosure will be described in detail with reference to the accompanying drawings. The same reference numerals will be used for the same elements in the drawings, and redundant descriptions of the same elements are omitted.

FIG. 1 is a diagram showing an overall architecture for providing 360 content in accordance with some embodiments.

In order to provide virtual reality (VR) to users, a method for providing 360-degree content may be considered. Here, the 360-degree content may be referred to as three Degrees of Freedom (3 DoF) content, and VR may refer to a technique or an environment for replicating a real or virtual environment. VR may artificially provide sensuous experiences to users and thus users may experience electronically projected environments therethrough.

360 content may refer to all content for realizing and providing VR, and may include 360-degree video and/or 360 audio. The 360 degree video and/or 360 audio may also be referred to as 3D video and/or 3D audio 360-degree video may refer to video or image content which is needed to provide VR and is captured or reproduced in all directions (360 degrees) at the same time. Hereinafter, 360-degree video may refer to 360-degree video. 360-degree video may refer to a video or image presented in various types of 3D space in accordance with a 3D model. For example, 360-degree video may be presented on a spherical surface. 360 audio may be audio content for providing VR and may refer to spatial audio content which may make an audio generation source recognized as being located in a specific 3D space. 360 audio may also be referred to as 3D audio. 360 content may be generated, processed and transmitted to users, and the users may consume VR experiences using the 360 content.

To provide 360-degree video, a 360-degree video may be captured first using one or more cameras. The captured 360-degree video may be transmitted through a series of processes, and the data received on the receiving side may be processed into the original 360-degree video and rendered. Then, the 360-degree video may be provided to a user.

Specifically, the entire processes for providing 360-degree video may include a capture process, a preparation process, a transmission process, a processing process, a rendering process and/or a feedback process.

The capture process may refer to a process of capturing images or videos for multiple viewpoints through one or more cameras. Image/video data as shown in part 110 of FIG. 1 may be generated through the capture process. Each plane in part 110 of FIG. 1 may refer to an image/video for each viewpoint. The captured images/videos may be called raw data. In the capture process, metadata related to capture may be generated.

A special camera for VR may be used for capture. In accordance with some embodiments, when a 360-degree video for a virtual space generated using a computer is to be provided, the capture operation using an actual camera may not be performed. In this case, the capture process may be replaced by a process of simply generating related data.

The preparation process may be a process of processing the captured images/videos and the metadata generated in the capture process. The captured images/videos may be subjected to stitching, projection, region-wise packing and/or encoding in the preparation process.

First, the images/videos may be subjected to the stitching process. The stitching process may be a process of connecting the captured images/videos to create a single panoramic image/video or a spherical image/video.

Then, the stitched images/videos may be subjected to the projection process. In the projection process, the stitched images/videos may be projected onto a 2D image. The 2D image may be referred to as a 2D image frame depending on the context. Projecting onto a 2D image may be referred to as mapping to the 2D image. The projected image/video data may take the form of a 2D image as shown in part 120 of FIG. 1.

The video data projected onto the 2D image may be subjected to the region-wise packing process in order to increase video coding efficiency. Region-wise packing may refer to a process of dividing the video data projected onto the 2D image into regions and processing the regions. Here, the regions may refer to regions obtained by dividing the 2D image onto which 360-degree video data is projected. In accordance with some embodiments, such regions may be distinguished by dividing the 2D image equally or randomly. In accordance with some embodiments, the regions may be divided in accordance with a projection scheme. The region-wise packing process may be an optional process and may thus be omitted from the preparation process.

In accordance with some embodiments, this processing process may include a process of rotating the regions or rearranging the regions on the 2D image in order to increase video coding efficiency. For example, the regions may be rotated such that specific sides of the regions are positioned close to each other. Thereby, efficiency may be increased in coding.

In accordance with some embodiments, the processing process may include a process of increasing or decreasing the resolution of a specific region in order to differentiate the resolutions for regions of the 360-degree video. For example, the resolution of regions corresponding to a relatively important area of the 360-degree video may be increased over the resolution of the other regions. The video data projected onto the 2D image or the region-wise packed video data may be subjected to the encoding process that employs a video codec.

In accordance with some embodiments, the preparation process may further include an editing process. In the editing process, the image/video data may be edited before or after the projection. In the preparation process, metadata for stitching/projection/encoding/editing may be generated. In addition, metadata about the initial viewpoint or the region of interest (ROI) of the video data projected onto the 2D image may be generated.

The transmission process may be a process of processing and transmitting the image/video data and the metadata obtained through the preparation process. Processing in accordance with any transport protocol may be performed for transmission. The data that has been processed for transmission may be delivered over a broadcast network and/or broadband. The data may be delivered to a reception side on an on-demand basis. The receiving side may receive the data through various paths.

The processing process may refer to a process of decoding the received data and re-projecting the projected image/video data onto a 3D model. In this process, the image/video data projected onto 2D images may be re-projected onto a 3D space. This process may be referred to as mapping projection depending on the context. Here, the shape of the 3D space to which the data is mapped may depend on the 3D model. For example, 3D models may include a sphere, a cube, a cylinder and a pyramid.

In accordance with some embodiments, the processing process may further include an editing process and an up-scaling process. In the editing process, the image/video data may be edited before or after the re-projection. When the image/video data has a reduced size, the size of the image/video data may be increased by up-scaling the samples in the up-scaling process. The size may be reduced through down-scaling, when necessary.

The rendering process may refer to a process of rendering and displaying the image/video data re-projected onto the 3D space. The re-projection and rendering may be collectively expressed as rendering on a 3D model. The image/video re-projected (or rendered) on the 3D model may take the form as shown in part 130 of FIG. 1. The part 130 of FIG. 1 corresponds to a case where the image/video data is re-projected onto a 3D model of sphere. A user may view a part of the regions of the rendered image/video through a VR display or the like. Here, the region viewed by the user may take the form as shown in part 140 of FIG. 1.

The feedback process may refer to a process of delivering various types of feedback information which may be acquired in the display process to a transmitting side. Through the feedback process, interactivity may be provided in 360-degree video consumption. In accordance with some embodiments, head orientation information, viewport information indicating a region currently viewed by a user, and the like may be delivered to the transmitting side in the feedback process. In accordance with some embodiments, the user may interact with content realized in a VR environment. In this case, information related to the interaction may be delivered to the transmitting side or a service provider in the feedback process. In some embodiments, the feedback process may be skipped.

The head orientation information may refer to information about the position, angle and motion of a user's head. Based on this information, information about a region currently viewed by the user in the 360-degree video, that is, viewport information may be calculated.

The viewport information may be information about a region currently viewed by a user in the 360-degree video. Gaze analysis may be performed using this information to check how the user consumes 360-degree video and how long the user gazes at a region of the 360-degree video. The gaze analysis may be performed at the receiving side and a result of the analysis may be delivered to the transmitting side on a feedback channel A device such as a VR display may extract a viewport region based on the position/orientation of the user's head, vertical or horizontal Field of View (FOV) information supported by the device, and the like.

In accordance with some embodiments, the aforementioned feedback information may be consumed on the receiving side as well as being delivered to the transmitting side. That is, decoding, re-projection and rendering processes of the receiving side may be performed using the aforementioned feedback information. For example, only 360-degree video corresponding to the region currently viewed by the user may be preferentially decoded and rendered using the head orientation information and/or the viewport information.

Here, the viewport or the viewport region may refer to a region of 360-degree video currently viewed by the user. A viewpoint may be a point which is viewed by the user in a 360-degree video and may represent a center point of the viewport region. That is, a viewport is a region centered on a viewpoint, and the size and shape of the region may be determined by FOV, which will be described later.

In the above-described architecture for providing 360-degree video, image/video data which is subjected to a series of capture/projection/encoding/transmission/decoding/re-projection/rendering processes may be called 360-degree video data. The term "360-degree video data" may be used as a concept including metadata or signaling information related to such image/video data.

To store and transmit media data such as the audio or video data described above, a standardized media file format may be defined. In accordance with some embodiments, a media file may have a file format based on ISO base media file format (ISOBMFF).

Figure 2:
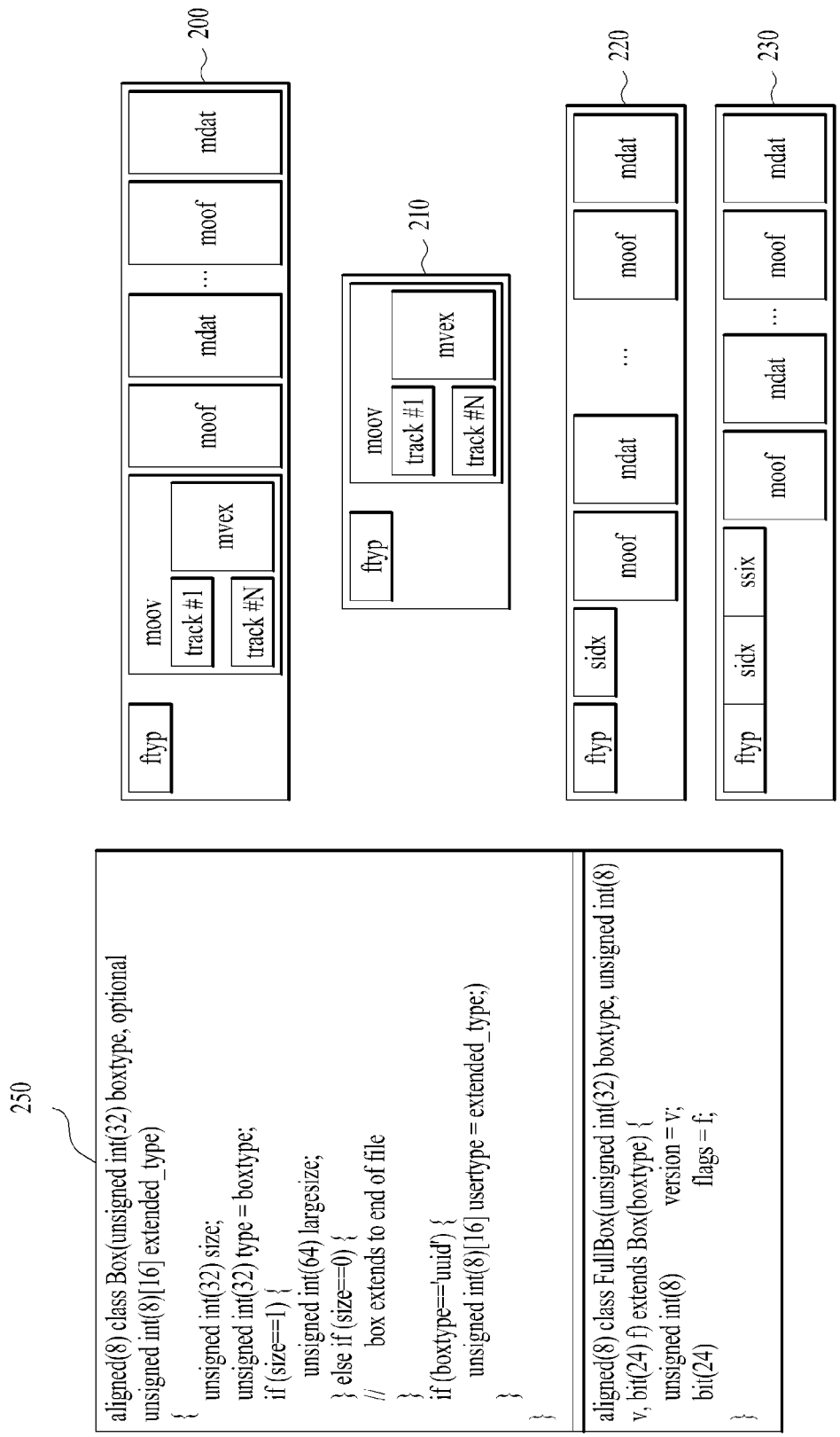
FIGS. 2 and 3 illustrate the structure of a media file in accordance with in accordance with some embodiments.
Figure 3:
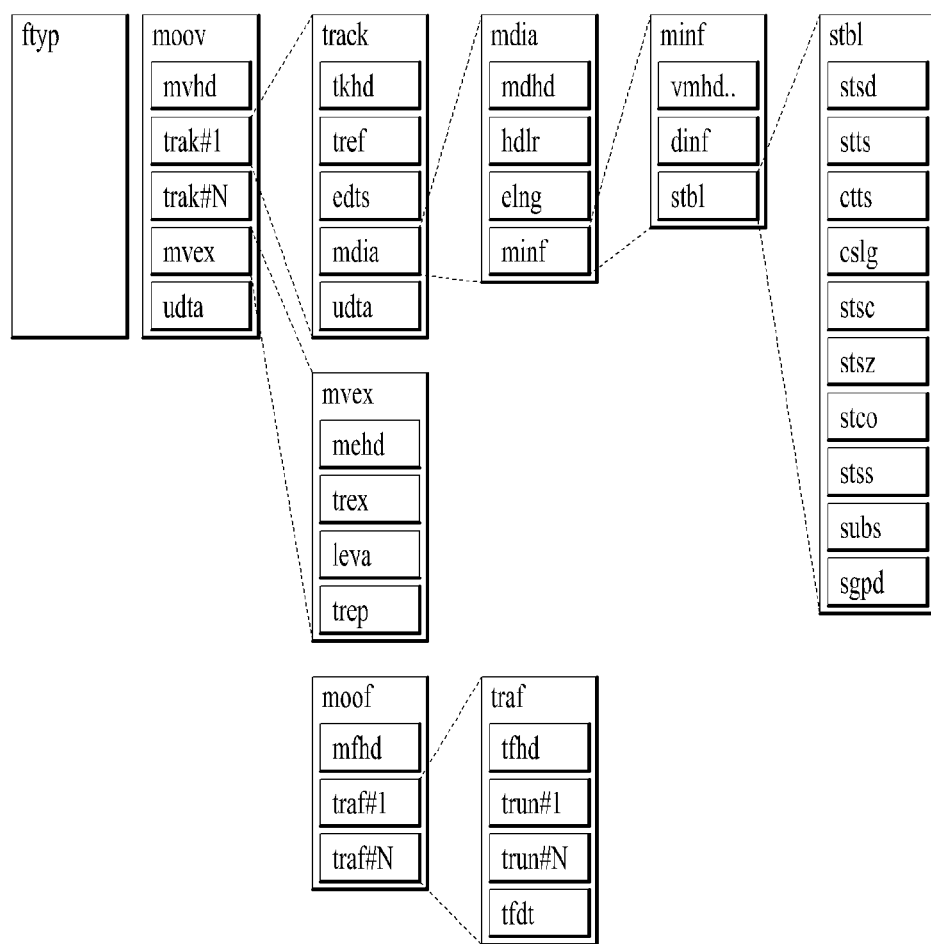

FIGS. 2 and 3 illustrate the structure of a media file in accordance with some embodiments.

A media file in accordance with some embodiments may include at least one box. Here, the box may be a data block or an object containing media data or metadata related to the media data. The boxes may be arranged in a hierarchical structure. Thus, the data may be classified in accordance with the boxes and the media file may take a form suitable for storage and/or transmission of large media data. In addition, the media file may have a structure which facilitates access to media information as in the case where the user moves to a specific point in the media content.

The media file in accordance with in accordance with some embodiments may include an ftyp box, a moov box and/or an mdat box.

The ftyp box (file type box) may provide information related to a file type or compatibility of a media file. The ftyp box may include configuration version information about the media data of the media file. A decoder may identify the media file with reference to the ftyp box.

The moov box (movie box) may include metadata about the media data of the media file. The moov box may serve as a container for all metadata. The moov box may be a box at the highest level among the metadata related boxes. In accordance with some embodiments, only one moov box may be present in the media file.

The mdat box (media data box) may a box that actually contains the media data of the media file. The media data may contain audio samples and/or video samples and the mdat box may serve as a container to contain such media samples.

In accordance with some embodiments, the moov box may include an mvhd box, a trak box and/or an mvex box as sub-boxes.

The mvhd box (movie header box) may contain media presentation related information about the media data included in the media file. That is, the mvhd box may contain information such as a media generation time, change time, time standard and period of the media presentation.

The trak box (track box) may provide information related to a track of the media data. The trak box may contain information such as stream related information about an audio track or a video track, presentation related information, and access related information. Multiple trak boxes may be provided depending on the number of tracks.

In accordance with some embodiments, the trak box may include a tkhd box (track header box) as a sub-box. The tkhd box may contain information about a track indicated by the trak box. The tkhd box may contain information such as a generation time, change time and track identifier of the track.

The mvex box (movie extend box) may indicate that the media file may include a moof box, which will be described later. The moov boxes may need to be scanned to recognize all media samples of a specific track.

In accordance with some embodiments, the media file may be divided into multiple fragments (200). Accordingly, the media file may be segmented and stored or transmitted. The media data (mdat box) of the media file may be divided into multiple fragments and each of the fragments may include a moof box and a divided mdat box. In accordance with some embodiments, the information of the ftyp box and/or the moov box may be needed to use the fragments.

The moof box (movie fragment box) may provide metadata about the media data of a corresponding fragment. The moof box may be a box at the highest layer among the boxes related to the metadata of the corresponding fragment.

The mdat box (media data box) may contain actual media data as described above. The mdat box may contain media samples of the media data corresponding to each fragment.

In accordance with some embodiments, the above-described moof box may include an mfhd box and/or a traf box as sub-boxes.

The mfhd box (movie fragment header box) may contain information related to correlation of multiple divided fragments. The mfhd box may include a sequence number to indicate the sequential position of the media data of the corresponding fragment among the divided data. In addition, it may be checked whether there is missing data among the divided data, based on the mfhd box.

The traf box (track fragment box) may contain information about a corresponding track fragment. The traf box may provide metadata about a divided track fragment included in the fragment. The traf box may provide metadata for decoding/reproducing media samples in the track fragment. Multiple traf boxes may be provided depending on the number of track fragments.

In accordance with some embodiments, the traf box described above may include a tfhd box and/or a trun box as sub-boxes.

The tfhd box (track fragment header box) may contain header information about the corresponding track fragment. The tfhd box may provide information such as a default sample size, period, offset and identifier for the media samples of the track fragment indicated by the traf box.

The trun box (track fragment run box) may contain information related to the corresponding track fragment. The trun box may contain information such as a period, size and reproduction timing of each media sample.

The media file or the fragments of the media file may be processed into segments and transmitted. The segments may include an initialization segment and/or a media segment.

The file of the illustrated embodiment 210 may be a file containing information related to initialization of the media decoder except the media data. This file may correspond to the above-described initialization segment. The initialization segment may include the ftyp box and/or the moov box described above.

The file of the illustrated embodiment 220 may be a file including the above-described fragments. For example, this file may correspond to the above-described media segment. The media segment may include the moof box and/or the mdat box described above. The media segment may further include an styp box and/or an sidx box.

The styp box (segment type box) may provide information for identifying media data of a divided fragment. The styp box may perform the same function as the above-described ftyp box for a divided fragment. In accordance with some embodiments, the styp box may have the same format as the ftyp box.

The sidx box (segment index box) may provide information indicating an index for a divided fragment. Accordingly, the sequential position of the divided fragment may be indicated.

An ssix box may be further provided in accordance with some embodiments 230. When a segment is further divided into sub-segments, the ssix box (sub-segment index box) may provide information indicating indexes of the sub-segments.

The boxes in a media file may further contain extended information about the basis of a box as shown in some embodiments 250 or a FullBox. In some embodiments, the size field, largesize, may indicate the length of a corresponding box in bytes. The version field may indicate the version of a corresponding box format. The Type field may indicate the type or identifier of the box. The flags field may indicate a flag related to the box.

In accordance with some embodiments, the fields (attributes) for 360-degree video may be carried in a DASH-based adaptive streaming model.

Figure 4:
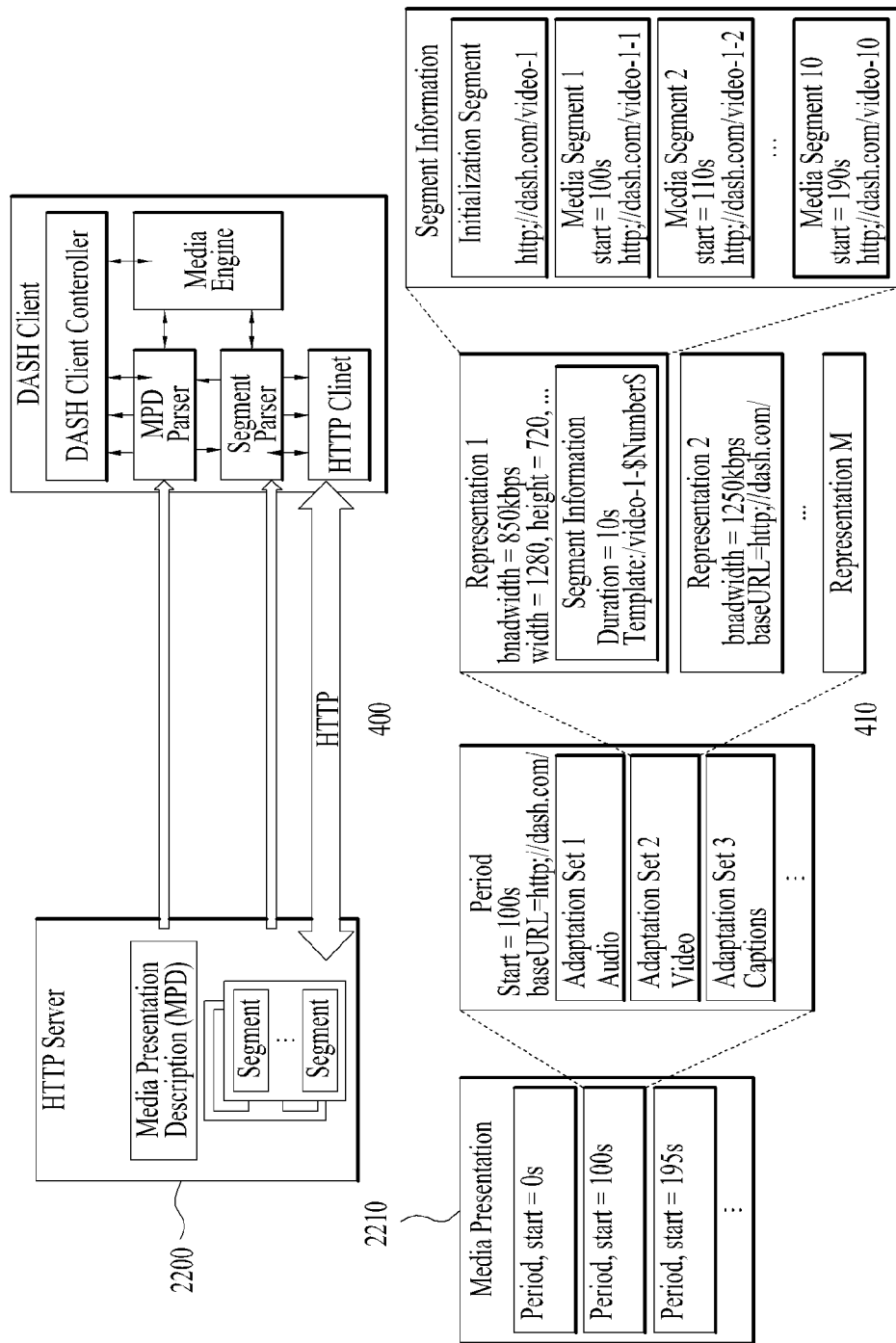
FIG. 4 illustrates an example of the overall operation of a DASH-based adaptive streaming model.

FIG. 4 illustrates an example of the overall operation of a DASH-based adaptive streaming model. A DASH-based adaptive streaming model in accordance with some embodiments 400 shown in the figure describes operations between an HTTP server and a DASH client. Here, DASH (dynamic adaptive streaming over HTTP) is a protocol for supporting HTTP-based adaptive streaming and may dynamically support streaming depending on the network condition. Accordingly, AV content may be seamlessly played.

First, the DASH client may acquire an MPD. The MPD may be delivered from a service provider such as the HTTP server. The DASH client may make a request to the server for segments described in the MPD, based on the information for accessing the segments. The request may be made based on the network condition.

The DASH client may acquire the segments, process the segments through a media engine and display the processed segments on a screen. The DASH client may request and acquire necessary segments by reflecting the playback time and/or the network condition in real time (Adaptive Streaming) Accordingly, content may be seamlessly played.

The MPD (media presentation description) is a file containing detailed information allowing the DASH client to dynamically acquire segments, and may be represented in an XML format.

A DASH client controller may generate a command for requesting the MPD and/or segments considering the network condition. In addition, the DASH client controller may control an internal block such as the media engine to use the acquired information.

An MPD parser may parse the acquired MPD in real time. Accordingly, the DASH client controller may generate a command for acquiring necessary segments.

A segment parser may parse the acquired segment in real time. Internal blocks such as the media engine may perform a specific operation in accordance with the information contained in the segment.

The HTTP client may make a request to the HTTP server for a necessary MPD and/or segments. In addition, the HTTP client may deliver the MPD and/or segments acquired from the server to the MPD parser or the segment parser.

The media engine may display content on the screen based on the media data included in the segments. In this operation, the information of the MPD may be used.

The DASH data model may have a hierarchical structure 410. Media presentation may be described by the MPD. The MPD may describe a time sequence of multiple periods for the media presentation. A period may represent one section of media content.

In one period, data may be included in adaptation sets. An adaptation set may be a set of multiple media content elements which may be exchanged. An adaption may include a set of representations. A representation may correspond to a media content element. In one representation, content may be temporally divided into multiple segments, which may be intended for appropriate accessibility and delivery. To access each segment, URL of each segment may be provided.

The MPD may provide information related to media presentation. A period element, an adaptation set element, and a representation element may describe a corresponding period, a corresponding adaptation set, and a corresponding representation, respectively. A representation may be divided into sub-representations. A sub-representation element may describe a corresponding sub-representation.

Here, common attributes/elements may be defined. The common attributes/elements may be applied to (included in) sub-representations. The common attributes/elements may include EssentialProperty and/or SupplementalProperty.

The EssentialProperty may be information including elements regarded as essential elements in processing the corresponding media presentation related data. The SupplementalProperty may be information including elements which may be used in processing the corresponding media presentation related data. In some embodiments, descriptors which will be described later may be defined and carried in the EssentialProperty and/or the SupplementalProperty when delivered through an MPD.

The descriptions given above with reference to FIGS. 1 to 4 generally relate to 3D video and 3D audio for implementing VR or AR content. Hereinafter, a process in which 3D audio data is processed in relation to some embodiments in accordance with the present disclosure will be described in more detail.

Figure 5A:
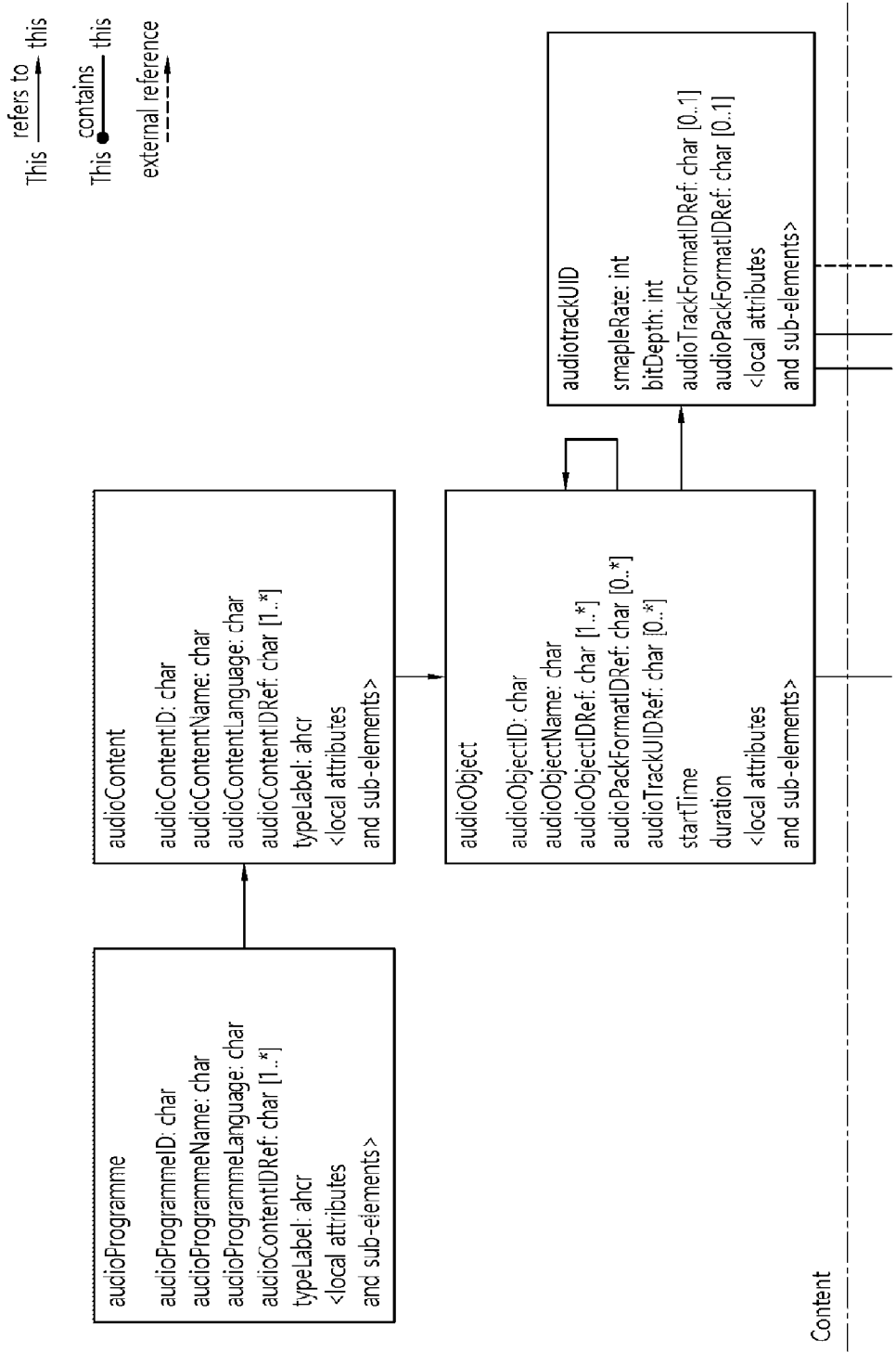
FIGS. 5A and 5B are diagrams illustrating an audio data model in accordance with some embodiments.
Figure 5B:
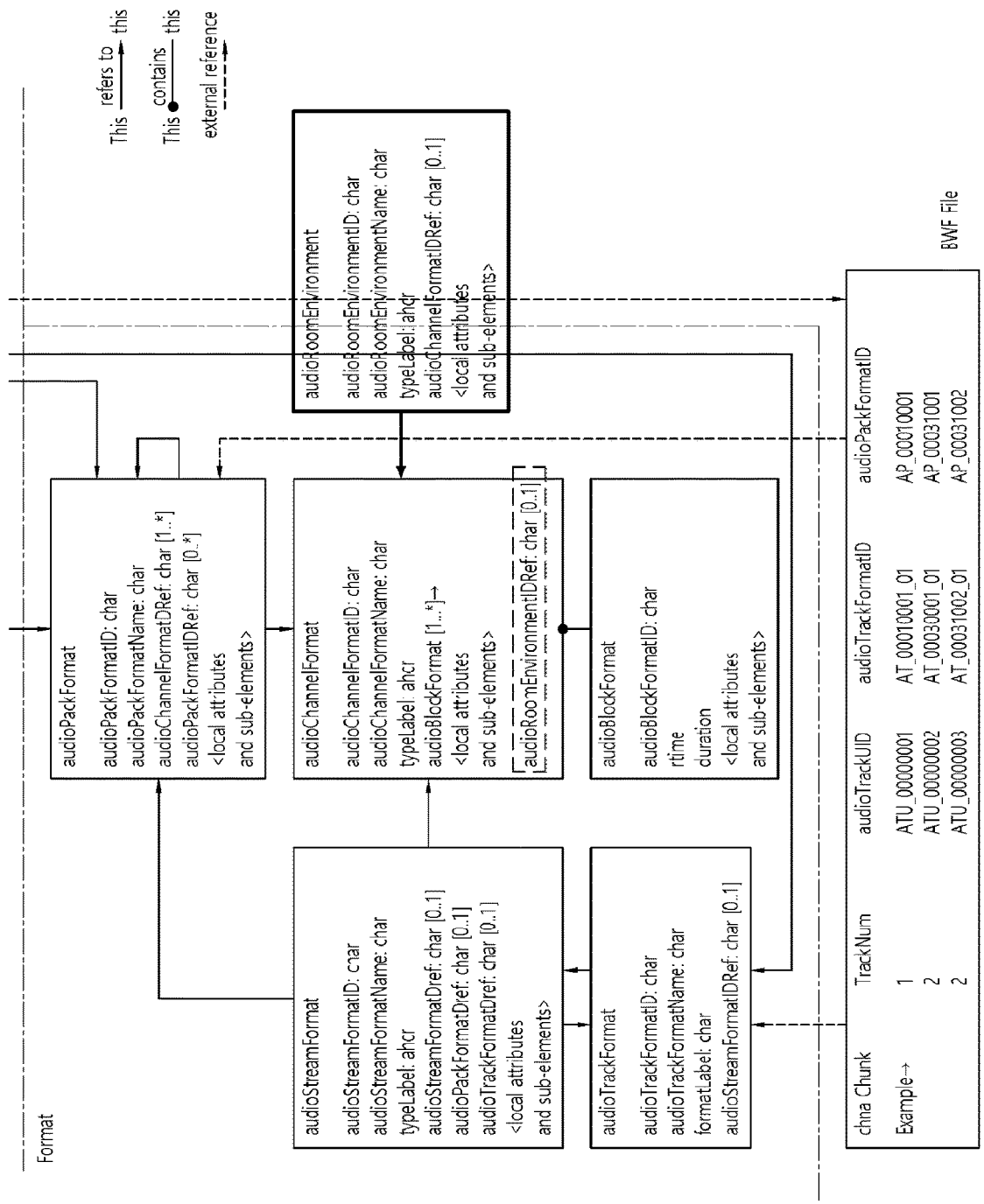

FIGS. 5A and 5B are diagrams illustrating an audio data model in accordance with some embodiments.

In this specification, "audio data model" may represent a model that organizes metadata about audio. The audio data model may include the audio definition model (ADM) of ITU-R (ITU Radiocommunication Sector) BS. 2076, ADM-extension, which is an extension of the ADM, DASH, and CTA, but are not limited thereto.

In this specification, "audio content" may represent media content such as video, 360 video, VR content, and AR content that contain audio information. In addition, "3D audio content" may represent three-dimensional media content such as 360 video, VR content, and AR content that contain audio information.

In this specification, the "audio data transmission apparatus" may represent an apparatus configured to transmit audio data such as audio signals and metadata about audio. The audio data transmission apparatus may not only transmit audio data to an audio data reception apparatus or the like, but also, in some cases, receive audio data from the audio data reception apparatus. The audio data transmission apparatus may be interpreted as being the same as/similar to a transmission terminal, a transmitter, a transmission apparatus, or a contents production terminal as disclosed in the this specification, as including the transmission terminal, the transmitter, the transmission apparatus, or the contents production terminal, or as being included in the transmission terminal, the transmitter, the transmission apparatus, or the contents production terminal. The audio data transmission apparatus, the transmission terminal, the transmitter, the transmission apparatus, or the contents production terminal may be, for example, a network, a server, a cloud server, a base station, a set-top box (STB), a PC, a user equipment (UE), a desktop, a TV, a laptop, or the like, or may be an element or module included in the exemplary devices. Further, devices similar to the exemplary devices may also operate as an audio data transmission apparatus, a transmission terminal, a transmitter, a transmission apparatus, or a contents production terminal. Examples are not limited thereto.

In this specification, the "audio data reception apparatus" may represent an apparatus configured to receive audio data such as audio signals and metadata about audio. The audio data reception apparatus may not only receive audio data from an audio data transmission apparatus, but also, in some cases, transmit audio data to the audio data reception apparatus. The audio data reception apparatus may be interpreted as being the same as/similar to a reception terminal, a receiver, or a reception apparatus as disclosed in this specification, as including the reception terminal, the receiver, or the reception apparatus, or as being included in the reception terminal, the receiver, or the reception apparatus. The audio data reception apparatus, the reception terminal, the receiver, or the reception apparatus may be, for example, a headphone, an earphone, a speaker, an HMD, a terminal, a set-top box, a network, a server, a PC, a desktop, a laptop, a camera, a camcorder, a TV, or the like, or may be an element or module included in the exemplary devices. Further, devices similar to the exemplary devices may also operate as an audio data reception apparatus, a reception terminal, a receiver, or a reception apparatus. Examples are not limited thereto.

In one embodiment, it may be difficult to deliver a stereoscopic effect to a user only by using a channel-based audio type. Accordingly, an object-based or Higher Order Ambisonic (HOA)-based audio type may be added to produce audio content.

In order to generate and render more diverse and realistic 3D audio data, metadata about audio as well as an audio signal may be generated and transmitted. Requirements of an audio content producer or an audio content user may be included in the metadata about the audio. The Audio Definition Model (ADM) or ADM-extension of ITU-R (ITU Radiocommunication Sector) BS. 2076 may include metadata indicating characteristics of audio content. Under a system for compressing, playing, and rendering audio, devices included in the system may transmit information about the requirements of the audio content producer or the audio content user through metadata.

Referring to FIGS. 5A and 5B, an audio data model in accordance with some embodiments is illustrated. The audio data model shown in FIGS. 5A and 5B may represent, for example, the concept and structure of the ADM or the ADM-extension. However, the audio data model shown in FIGS. 5A and 5B should not be interpreted as being limited to the ADM or the ADM-extension.

In one embodiment, the content shown in FIGS. 5A and 5B may correspond to the ITU-R standard document. The audio data model illustrated in FIGS. 5A and 5B may be largely classified into a content part and a format part. The content part may be intended to describe the content contained in the audio, such as the language of the dialogue or loudness, and the format part, which is a part to describe the technical characteristics of the audio, may be intended to specify an audio type and provide information for rendering. The content part and the format part may each be composed of a plurality of elements (or fields, categories, etc.), and each of the elements may be defined based on ID and name information about the corresponding element. In one example, some elements of the format part may be predefined before an audio signal is generated, and most elements of the content part may be defined after an audio signal is generated. In expressing the elements of the ADM through metadata about audio, an XML language may be used. When necessary, the language may be converted to other languages such as JSON (JavaScript Object Notation).

In this specification, specific terms or sentences are used to define specific information or concepts. For example, in this specification, specific terms or sentences are used to define specific metadata. In one example, this specification defines metadata representing environment information about a space in which 3D audio content is played as "audioRoomEnvironment". However, "audioRoomEnvironment" may be replaced with various terms such as 3D audio content space information, 3D space information, audioSpaceEnvironment, and audioRoomEnvironmentInformation. Therefore, in this specification, a specific term or sentence used to define specific information or concepts should not be interpreted as limited to the name thereof, and needs to be interpreted based on various operations, functions, and effects in accordance with the content that the term intends to represent.

In accordance with some embodiments of the present disclosure, the audio data model may include playback environment for 3D audio content. More specifically, as illustrated in FIG. 5, environment information (e.g., audioRoomEnvironment) about a space in which 3D audio content is played may be included. In accordance with the present disclosure, the 3D audio content may be smoothly delivered, played, and rendered in the 6 DoF environment as well as the 3 DoF and 3 DoF+ environments by providing the playback environment information for the 3D audio content.

In one embodiment, the content part of the ADM may include an audio program (e.g., audioProgramme), audio content (e.g., audioContent), an audio object (e.g., audioObject), and an audio track UID (e.g., audioTrackUID). The content part represents overall feature information included in the audio content. For example, the content part may include a language, sound source size information, program information, and the like supported in audio content.

audioObject may be used to establish an relationship between audioContent, audioPackFormat and audioTrackUID. More specifically, the audioObject may indicate information about audio tracks belonging to the same group and the position thereof in a file. For example, when any audio content contains stereo audio (i.e., 2 PCMs), audioObject may be configured to refer to two audioTrackUIDs based on an attribute (audioTrackUIDRef) referring to the audio track-related content and to refer to an audio pack defining two tracks in stereo based on another attribute (audioPackFormatDRef) to refer to the format part. audioObject may refer to another audioObject.

audioContent may describe the configuration information about one of the entire programs, such as background music, narration, or conversational voice, and may connect contents described in audioContent to elements of the format part by referencing the audioObject described above. In addition, since audioContent contains metadata about sound volume, it may describe loudness information.

Since one program consists of one or more audioContents combined, the audioProgramme may refer to one or more audioContents simultaneously. In addition, audioProgramme contains a timecode describing the start and end times of the program. This information is used in matching the timecode of the video. Similar to audioContent, audioProgramme may also contain metadata about the sound volume, and may thus describe the loudness of the entire program.

The audioTrackUID is not an element belonging to the format part or the content part, but the ADM may uniquely identify all audio tracks in a file based on audioTrackUID. Accordingly, individual audio tracks constituting an audio signal may each correspond to one audioTrackUID. In one example, in the case of a 5.1-channel signal, 6 audio tracks (including sub-woofer tracks) may be used, and thus 6 audioTrackUIDs may be used. An audioTrackUID may contain information such as the bit-size (e.g., 16 bits, 24 bits, etc.) and the sampling rate of an audio track, and may also contain attributes that configure the ADM so as to be used even in programs other broadcast wave format (BWF) applications through the <chna> chunk.

Hereinafter, a detailed description will be given of an audio pack format (e.g., audioPackFormat), an audio stream format (for example, audioStreamFormat), an audio channel format (e.g., audioChannelFormat), an audio track format (e.g., audioTrackFormat) and an audio block format (e.g., audioBlockFormat), which are in the format part, and the environment information (e.g., audioRoomEnvironment) about a space in which 3D audio content is played in accordance with some embodiments of the present disclosure will be described in detail.

Figure 6:
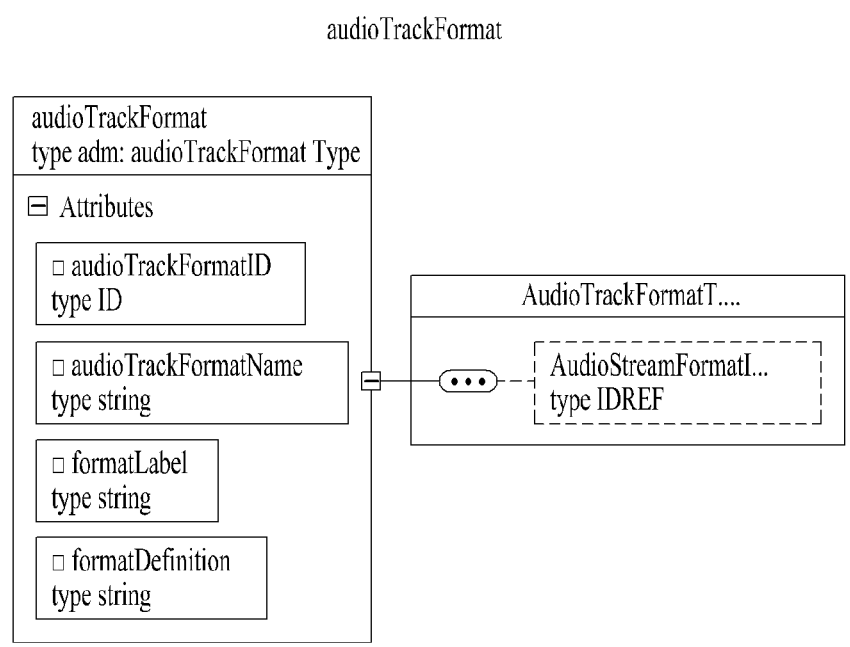
FIG. 6 shows an example of elements of an audio track format included in an audio data model in accordance with some embodiments.

FIG. 6 shows an example of elements of an audio track format included in an audio data model in accordance with some embodiments.

The audio track format, for example audioTrackFormat, may correspond to a single track of a storage medium. audioTrackFormat may be used to describe the data format of audio for decoding an audio signal, such that the renderer of a reception terminal (e.g., an audio data reception apparatus) may render the audio signal. In one example, audioTrackFormat may be used to describe speaker layout information.

When the receiver needs to describe a combination of tracks (i.e., multiple tracks at the same time) for decoding, audioTrackFormat may refer to audioStreamFormat, which is another element in the format part.

As shown in FIG. 6, audioTrackFormat may include attributes such as audioTrackFormatID, audioTrackFormatName, formatLabel, and formatDefinition, and sub-elements such as audioStreamFormatIDRef. The attributes may mean properties. Examples of the attributes of audioTrackFormat are shown in Table 1 below, and an example of the sub-elements of audioTrackFormat is shown in Table 2 below.

TABLE 1

| Attribute | Description | Example | Required |
|---|---|---|---|
| audioTrackFormatID | ID for track, see § 6. The yyyy digits of AT_yyyyxxxx_nn_represent the type of audio contained in the track. The yyyyxxxx digits should match the audioStreamFormat yyyyxxxx digits | AT_00010001_01 | Yes |
| audioTrackFormatName | Name for track | PCM_FrontLeft | Yes |
| formatLabel | Descriptor of the format | 0001 | Optional |
| formatDefinition | Description of the format | PCM | Optional |

TABLE 2

| Element | Description | Example | Quantity |
|---|---|---|---|
| audioStreamFormatIDRef | Reference to an audioStreamFormat | AS_00010001 | 0 or 1 |

In Table 1, audioTrackFormatID may represent ID information for identifying audioTrackFormat, and audioTrackFormatName may represent name information for identifying audioTrackFormat. formatLabel may represent label information for identifying the format. In one example, formatLabel may indicate the identification information about a level lower than audioTrackFormatID. formatDefinition may be used in describing a characteristic of an audio signal. For example, formatDefinition may indicate whether the audio signal is related to PCM.

Table 2 shows a sub-element of audioTrackFormat. The sub-element may contain information for associating the corresponding element with other elements. In one example, audioStreamFormatIDRef shown in Table 2 may mean that audioTrackFormat refer to audioStreamFormat indicated by a corresponding sub-element.

In one embodiment, the audio stream format, for example, audioStreamFormat, may serve to establish a relationship between audioTrackFormat and audioChannelFormat or audioPackFormat. A stream may mean a combination (or bundle) of one or more tracks required in rendering a channel, an object, an HOA signal, a pack, or the like. In the ADM, audioStreamFormat may be used to describe information about the stream. In one example, audioStreamFormat may be used in describing a non-PCM encoded track. Here, the encoded track may represent a signal in which one or more audioTrackFormats are packed and decoded. That is, in one example, a PCM-type audio signal may be described using audioTrackFormat, and examples of a non-PCM-type signal (examples of which include, but is not limited to, a bitstream that is based on .mp3, .aac, .ac3, or the like) may be described using audioStreamFormat.

Figure 7:
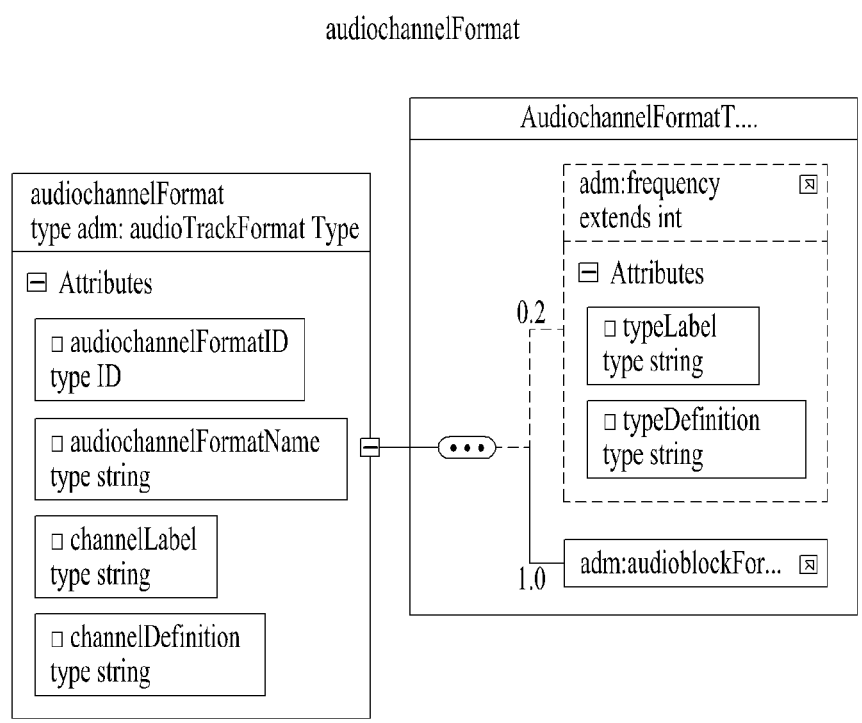
FIG. 7 shows an example of elements of an audio track format included in an audio data model in accordance with some embodiments.

FIG. 7 shows an example of elements of an audio track format included in an audio data model in accordance with some embodiments.

The audio channel format, for example, audioChannelFormat, may represent a single sequence of audio samples, and feature information about channel, object and HOA type audio signals may be described with audioChannelFormat. In one example, when a channel type signal is included in audio content, channel related information may be described for the signal with audioChannelFormat. When an object type signal is included in the audio content, object related information may be described for the signal. The feature information about each type of signal may appear in the time domain based on one or more audioBlockFormats (Referring to FIG. 5, audioBlockFormat may be a sub-element of audioChannelFormat).

As shown in FIG. 7, audioChannelFormat may contain attributes such as audioChannelFormatName, audioChannelFormatID, typeLabel, and typeDefinition. Examples of the attributes of audioChannelFormat are shown in Table 3 below, and examples of information contained in typeDefinition and typeLabel are shown in Table 4 below.

label for identifying the type of a channel, and typeDefinition may specifically indicate the type of the channel. Parameters of audioBlockFormat may be determined based on the information set in typeDefinition. Examples of audio types that may be defined in typeDefinition are shown in Table 4.

Table 4 shows DirectSpeakers, Matrix, Objects, HOA, Binaural and User Custom as examples of typeDefinition. When typeDefinition is set to DirectSpeakers (channel type signal) in accordance with typeLabel=0001, audioBlockFormat may be defined only with parameters for the channel type signal. When typeDefinition is set to Objects (object type signal) in accordance with typeLabel=0003, audioBlockFormat may define position and characteristics information (e.g., dry or wet) about an object. In one example, when any audio content contains an audio scene where an object moves from left to right for 3 seconds, audioChannelFormat may describe, based on three audioBlockFormats (e.g., audioBlockFormat1, audioBlockFormat2, and audioBlockFormat3), the information about the time at which each audioBlockFormat starts (for example, 1 sec for audioBlockFormat1, 2 sec for audioBlockFormat2, 3 sec for audioBlockFormat3), and object position information related to each audioBlockFormat (for example, Left for the object related to audioBlockFormat1, Midddle for the object related to audioBlockFormat2, and Rigth for the object related to audioBlockFormat3), thereby representing information about an object included in the audio content.

The above-described examples in Table 4 are only for understanding, and the scope of the present disclosure is not limited to the examples described above. For example, the

TABLE 3

| Attribute | Description | Example | Required |
| --- | --- | --- | --- |
| audioChannelFormatName | Name of the channel | FrontLeft | Yes |
| audioChannelFormatID | ID of the channel, see § 6 for the use of the audioChannelFormatID in typical channel configurations. The yyyy digits of AC_yyyyxxxx_represent the type of audio contained in the channel. The xxxx digits should match the audioStreamFormat xxxx digits. | AC_00010001 | Yes |
| typeLabel | Descriptor of the type of channel | 0001 | Optional |
| typeDefinition | Description of the type of channel | DirectSpeakers | Optional |

TABLE 4

| typeDefinition | typeLabel | Description |
| --- | --- | --- |
| DirectSpeakers | 0001 | For channel-based audio, where each channel feeds a speaker directly |
| Matrix | 0002 | For channel-based audio where channels are matrixed together, such as Mid-Side, Lt/Rt |
| Objects | 0003 | For object-based audio where channels represent audio objects (or parts of objects), so include positional information |
| HOA | 0004 | For scene-based audio where Ambisonics and HOA are used |
| Binaural | 0005 | For binaural audio, where playback is over headphones |
| User Custom | 1xxx to Fxxx | For user custom types. |

In Table 3, audioChannelFormatName may represent name information for identifying audioChannelFormat, and audioChannelFormatID may represent ID information for identifying audioChannelFormat. typeLabel may represent a number of audioBlockFormats is not limited to three, and may be less or greater than three. In another example, the position of the object related to each audioBlockFormat may be more specifically indicated than the expressions such as left, middle, and right. For example, the position of the object related to each audioBlockFormat may be indicated based on azimuth, elevation, and distance information, and the like.

In one embodiment, the audio pack format, for example audioPackFormat, may group audioChannelFormats. In one example, channel type formats such as 'stereo' and '5.1' may refer to audioPackFormat grouping different audioChannelFormats. In audioPackFormat, typeDefinition may be defined as in the case of audioChannelFormat. The defined typeDefinition may be used in defining the type of the audio signals that are packed and grouped. Accordingly, the typeDefinition defined in audioPackFormat may be the same as the typeDefinition defined in audioChannelFormat.

Figure 8:
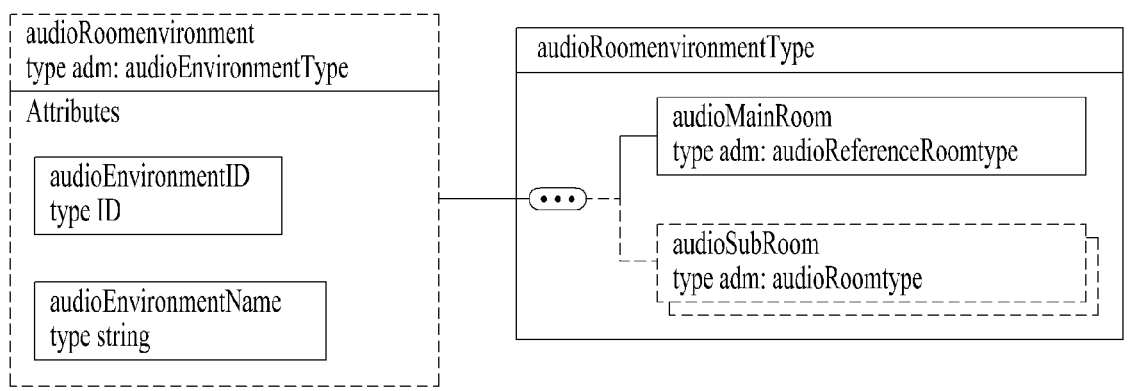
FIG. 8 shows an example of elements of environment information about a space in which audio content is played in accordance with some embodiments of the present disclosure.

FIG. 8 shows an example of elements of environment information about a space in which audio content is played in accordance with some embodiments of the present disclosure.

Generally, in the ADM, speaker position information may be described for channel type signals, and position information, gain information, and other feature information (e.g., diffuseness, wetness, screen inter-connection information, etc.) about each object may be described for object type signals. The characteristics of HOA type signals may be described based on the degree and order values with reference to information about the number of microphones used for recording at the transmission terminal (e.g., an audio data transmission apparatus).

Based on the information about the channel type signals, the information about the object type signals, and the information about the HOA type signals, audio content for a 3 DoF or 3 DoF+ environment may be processed. Some embodiments of the present disclosure intends to further process the audio content not only in the 3 DoF or 3 DoF+ environment and but also in a 6 DoF environment.

One embodiment of the present disclosure relates to playback environment information for 3D audio content. In one example, the ADM may include playback environment information for the 3D audio content. More specifically, the ADM may include the environment information about a space in which the 3D audio content is played. The environment information about the space in which the 3D audio content is played may be represented by, for example, audioRoomEnvironment.

In accordance with FIG. 8, audioRoomEnvironment may include audioEnvironmentID and audioEnvironmentName as attributes, and include audioMainRoom, which specifies information about a main room included in a space in which 3D audio content is played, and audioSubRoom, which specifies information about (at least one) sub-room included in the space in which the 3D audio content is played, as sub-elements. However, embodiments are not limited thereto. The audioRoomEnvironment may have various structures. The audioMainRoom will be described in detail later with reference to FIG. 9, and the audioSubRoom will be described in detail later with reference to FIG. 10.

In accordance with some embodiments, in FIG. 8, the solid lines may indicate mandatory elements, and the dotted lines may indicate optional elements. In other words, audioRoomEnvironment is an optional element, not a mandatory element. However, when audioRoomEnvironment is contained in metadata about audio, audioMainRoom may need to be mandatorily included in the metadata about audio.

Position information about audio signals played in any environment may be described using elements defined in the ADM. The position information is generally expressed in meters or angle units. When the playback environment information is to be expressed in meters, the position information about signals may be presented by setting any one corner as a reference point. When the playback environment information is to be expressed in angle units, the position information about the signals may be presented by setting the center of the playback environment as a reference point. In one example, when the positions of signals are to be expressed as angle information, azimuth, elevation and distance values may be used as position information about a speaker for channel type signals and position information about each object for object type signals. However, in addition to the above-described information, information defining a playback space, more specifically, a (virtual) space in which audio content is produced, needs to be described. In the 6 DOF environment, unlike in the 3 DoF environment, the user may freely move around the playback space at any time while any content is being played. Accordingly, to use the ADM in 6 DoF, playback space information should also be taken into consideration. The playback space information will be described in detail later with reference to FIG. 9B.

Figure 9A:
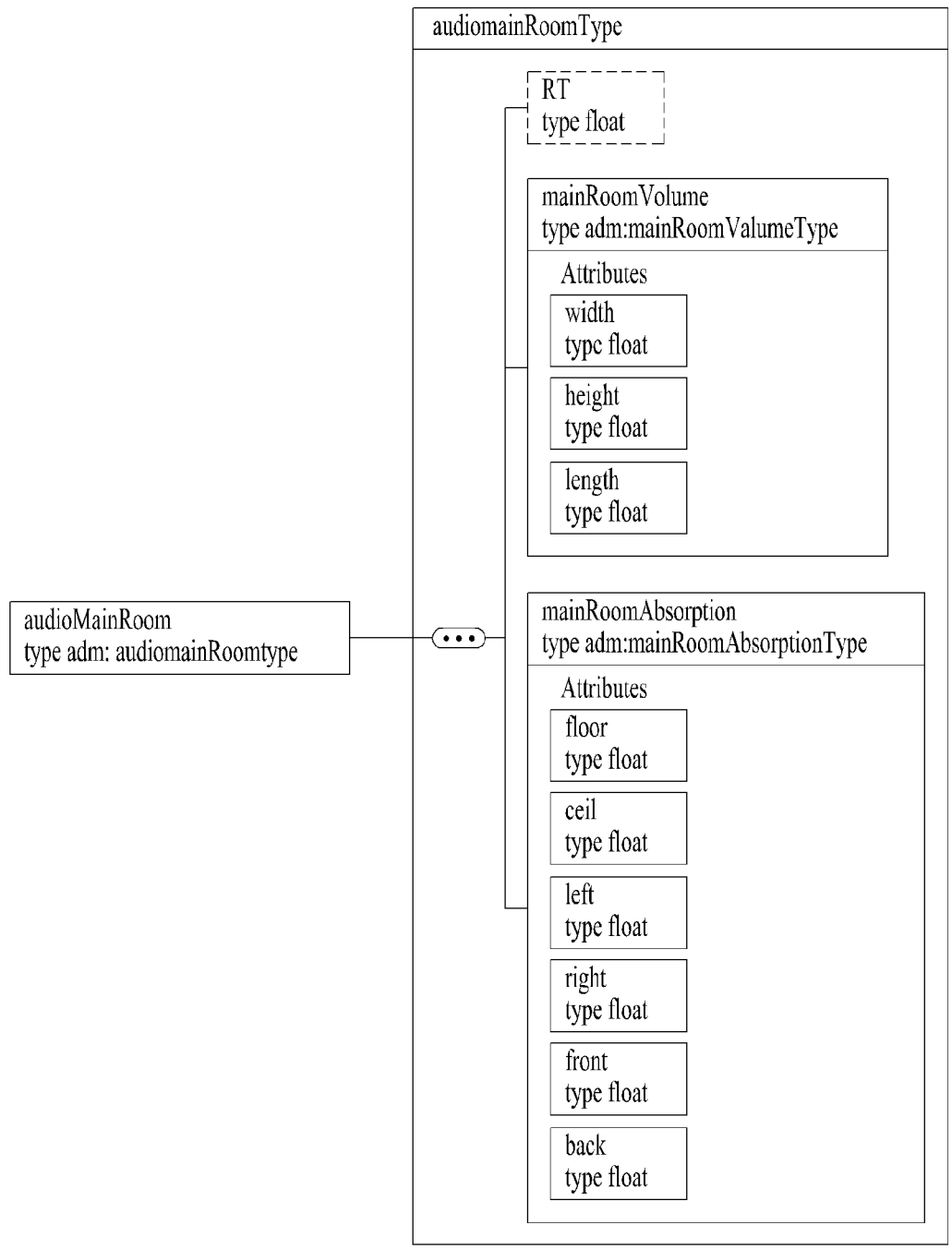
FIGS. 9A to 9C are diagrams illustrating a main room in a space in which audio content is played in accordance with some embodiments of the present disclosure.
Figure 9B:
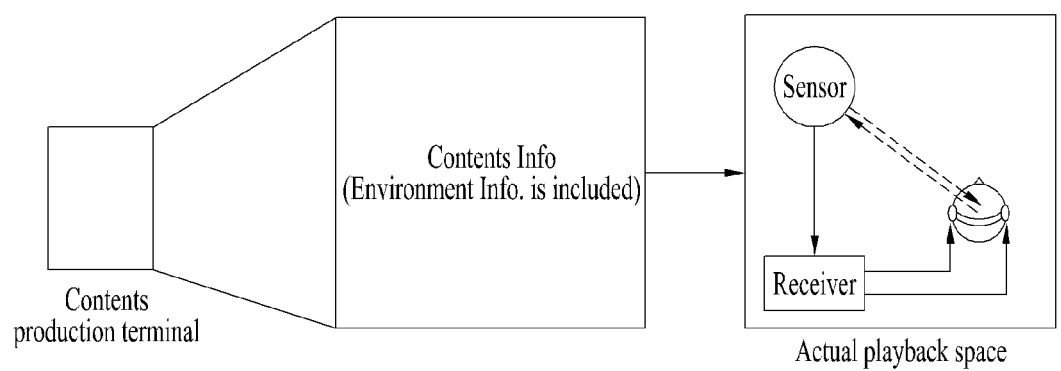
Figure 9C:
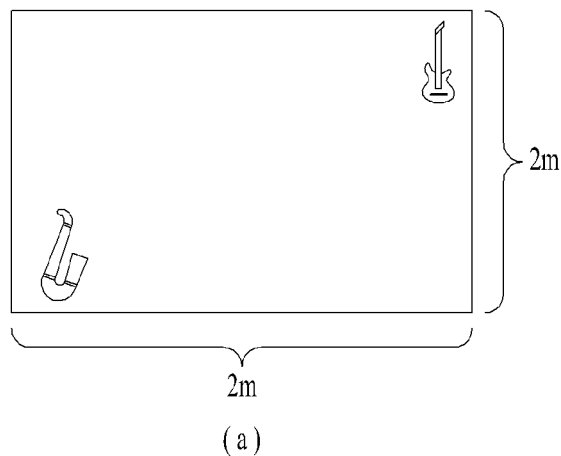
Figure 9C:
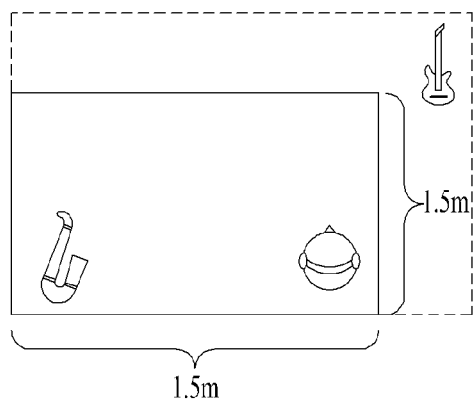
Figure 9C:
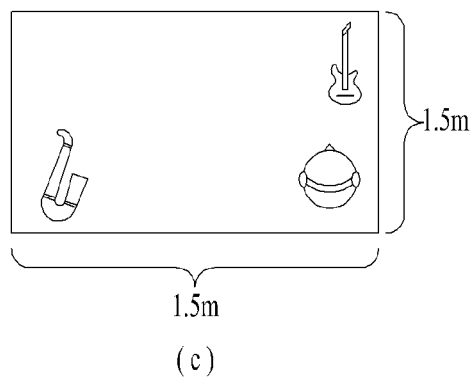

FIGS. 9A to 9C are diagrams illustrating a main room in a space in which audio content is played in accordance with some embodiments of the present disclosure.

Referring to FIG. 9A, audioMainRoom in accordance with some embodiments may include information about a reverberation time (RT60), mainRoomVolume, and mainRoomAbsorption. More specifically, the Reverberation Time (RT60) may be included in an attribute of audioMainRoom, and mainRoomVolume and mainRoomAbsoprtion may be included in sub-elements of audioMainRoom. Table 5 may show an example of the attribute of audioMainRoom, and Table 6 may show an example of the sub-elements of audioMainRoom.

TABLE 5

| Attribute | Description | Example | Quantity |
|---|---|---|---|
| RT60 | Reverberation time | 0.5 | 0 or 1 |

TABLE 6

| Element | Attribute | Description | Units | Example |
|---|---|---|---|---|
| mainRoomVolume | width | Width of the playback space | meter | +30.0 |
| | height | Height of the playback space | meter | −15.0 |
| | length | Length of the playback space | meter | 1.0 |
| mainRoomAbsorption | floor | Property of the material of the floor constituting the playback space (indicated by sound absorption coefficient) | 0.0 to 1.0 | 0.3 |
| | ceil | Property of the material of the ceiling constituting the playback space (indicated by sound absorption coefficient) | 0.0 to 1.0 | 0.7 |
| | left | Property of the material of the left wall constituting the playback space (indicated by sound absorption coefficient) | 0.0 to 1.0 | 0.5 |
| | right | Property of the material of the right wall constituting the playback space (indicated by sound absorption coefficient) | 0.0 to 1.0 | 0.5 |

TABLE 6-continued

| Element | Attribute | Description | Units | Example |
| --- | --- | --- | --- | --- |
| | front | Property of the material of the front wall constituting the playback space (indicated by sound absorption coefficient) | 0.0 to 1.0 | 0.6 |
| | back | Property of the material of the rear wall constituting the playback space (indicated by the sound absorption coefficient) | 0.0 to 1.0 | 0.6 |

Referring to Table 5, it may be seen that the reverberation time (RT60) may be an example of the attribute of audioMainRoom, and information about an example and a quantity may be provided.

Referring to Table 6, mainRoomVolume and mainRoomAbsorption are disclosed as examples of the sub-elements of audioMainRoom.

mainRoomVolume may represent size information or volume information about the main room included in the (virtual) space where audio content is played. The size information about the main room may include at least one of, for example, information about the width of the main room, information about the length of the main room, and information about the height of the main room.

mainRoomAbsorption may represent property information about the main room included in the (virtual) space where the audio content is played. The property information about the main room may indicate, for example, properties (e.g., sound absorption coefficient) of materials constituting the space in which the audio content is played. Assuming that the environment in which the audio content is produced is a three-dimensional space of a cube (or rectangular parallelepiped), the material properties of the space may be represented based on the sound absorption coefficient information (floor, ceil, left, right, front, and back) about the six faces consisting of the floor, ceiling, and four walls. More specifically, the property information about the main room may include at least one of the material property of the floor constituting the main room, the material property of the ceiling constituting the main room, and the material property of the left wall constituting the main room, the material property of the right wall constituting the main room, the material property of the front wall constituting the main room, and the material property of the back wall constituting the main room.

In one embodiment, the sound absorption coefficient may be determined as a value between 0 and 1. As the sound absorption coefficient approaches 1, it may be determined that the material reflects better. When the size information about the main room defined in Table 6 is given, the reception terminal may generate an optimal Binaural Room Impulse Response (BRIR) at any position and perform smooth rendering based on the generated optimal BRIR.

The reverberation time may increase as the materials constituting the space reflect better. Thus, for example, in a place where the wall or the floor is covered with carpet, the reverberation time may be short. In a space configured with tiles, such as a bathroom, the reverberation time may be long. Further, depending on the reverberation time, the user may experience different feelings. The reverberation time may be calculated when the material properties and space size values defined above are given. However, in one embodiment, the reverberation time listed in Table 5 may also be separately provided to further diversify the methods of generating BRIR (RT60). If only reverberation time information is given in the implementation process, the late reverberation part constituting the BRIR may be modeled separately. Accordingly, this parameter may provide convenience in implementation. However, as shown in FIG. 9A, the RT 60 may be omitted because it is an optional element, not a mandatory element.

FIG. 9B illustrates a process of transmitting information about a playback space where audio content is produced from a contents production terminal (transmission terminal) to a reception terminal. When the actual playback space for the user is smaller than the playback space where the content was produced, the actual playback space that the user may move around may differ from the production playback space. Accordingly, in this case, the receiver needs to reflect the information about the playback space where the audio content was produced in the actual playback space.

For example, assuming that the audio content is produced in a space with the width and length of [2 m, 2 m], and a speaker (channel) or an object is set to be located at a distance of 2 m (from a user who is assumed to be at the left corner of the space), the speaker (channel) or object should be mapped to a playback space with a width of [1 m, 1 m] so as to be located at a distance of 1 m. In other words, in order to smoothly perform rendering in accordance with the space in which the user moves, size information about the production space is needed. This feature also appears similarly for the HOA type signal. In order to use the HOA type signal in 6 DoF, the audio scene needs to be captured at various positions on the transmission terminal side. However, as in the example disclosed above, when the size of the production space of the audio content does not coincides with the size of the playback space, the size of the production space of the audio content (the size of the space where the audio scene is captured) needs to be mapped so as to fit the size of the playback space. Accordingly, space size information about the captured environment is needed.

In the example described above, the necessity of playback environment information is considered in the speaker environment in using 6 DoF audio content. The playback environment information is used even in the headphone environment for a similar purpose. As in the example disclosed above, the width and length of the production space and the playback space of the audio content may be assumed to be [2 m, 2 m] and [1 m 1 m], respectively. In this case, since the user cannot move as far as the space in which the audio content is produced, the user may select one of the following two methods to render the signal of the audio content in the headphone environment.

The first method is to render audio signals contained in the audio content depending on the playback space size. In other words, the position information about the signals of the audio content may be mapped in accordance with the playback space size. This is the same as in the case of mapping the position information about speakers or objects in the speaker environment, and means that a signal produced to be played at a distance of 2 m is rendered to be played at a distance of 1 m in the actual playback space.

Therefore, despite the difference in size between the two spaces, the user may feel that the volume of the sound heard when the user stands at the foot of the wall of the actual playback space is the same as the volume of the sound heard when the user stands at the foot of the wall of the space where the audio content was produced. In other words, the user may experience the features provided by the audio content in the playback space of a different size.

Another method is to independently render audio signals contained in the audio content in the playback space. That is, the audio signals of the audio content may be rendered in accordance with the production position regardless of the playback environment. Thus, when the user experiences the audio content in a space smaller than the content production space, even when the user reaches the end point of the space, the user may feel that any sound source is still distant. In the present disclosure, the necessity of space size information in producing 6 DoF audio content with the ADM has been described through one example. The two rendering methods described above are merely an example, and do not limit the scope of the present disclosure.

When a user experiences 6 DoF VR audio content using a headphone, not only the size of the space in which the content is being played, but also information about the properties of the space may be required. To render any audio signal at any position when the user listens to a sound source using the headphone, the audio signal needs to be filtered for the BRIR. However, in a 6 DoF environment in which the user is allowed to freely move, the characteristics of the BRIR change depending on the position to which the user moves, and therefore the changed BRIR needs to be applied to the audio signal in real time by referencing the position information about the user and the position information about the sound source. In this regard, the receiver in accordance with some embodiments may generate a BRIR in real time based on the position of the user and apply the same to an audio signal to render the audio signal. In order to generate the BRIR in real time, property information about the space, that is, information about the materials the space is made of may be needed.

In FIG. 9C, (a), (b), and (c) illustrate a case where the size of the space in which the audio content is produced is different from the size of the actual playback space in which the user is located. Referring to (a) of FIG. 9C, [width, length, height] of the space size in the audio content transmitted to the reception terminal is [2 m, 2 m, 2 m]. Referring to (b) of FIG. 9c, the dimensions of [width, length, height] of a playback environment measured by sensors installed in the playback environment are given as [1.5 m, 1.5 m, 1.5 m]. That is, the actual playback environment is smaller than the playback environment in the content. When information related to the audio content is used as it is despite the difference in environment between the contents production terminal and the reception terminal as described above, the user may be restricted in terms of the degree of freedom in using the content. That is, the user may not fully experience the content due to the limited space. Therefore, in order to overcome this issue, the information received from the sensors may be transmitted to the receiver, and the receiver may compare the content information transmitted from the transmission terminal with the actual playback environment information and change the audio content information as shown in (c) of FIG. 9C. Referring to (c) of FIG. 9C, it may be seen that the musical instruments located at the corners between the respective faces are positioned so as to correspond to the playback environment, and the basic volume of the musical instruments is reduced as the size of the space is reduced.

Figure 10:
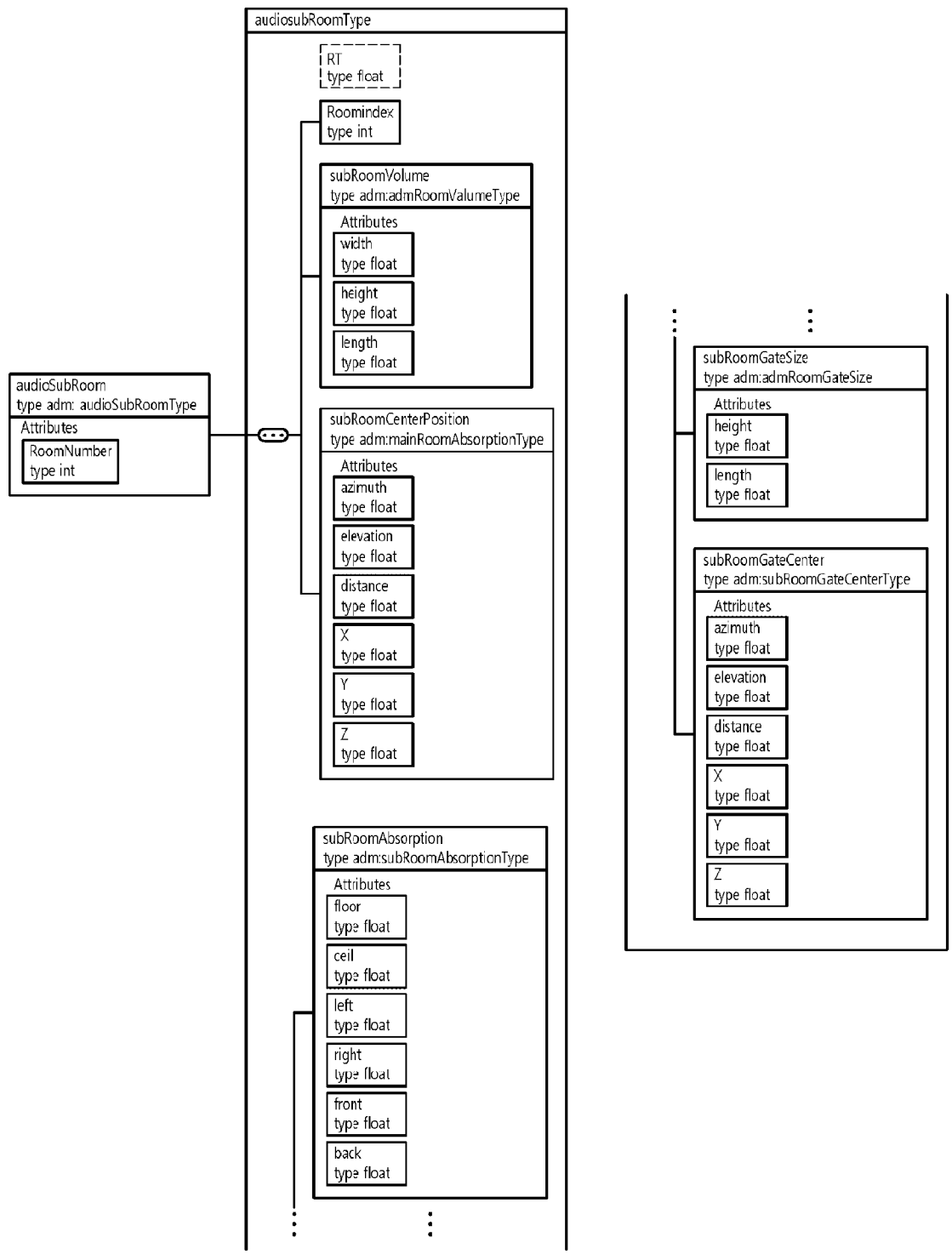
FIG. 10 is a diagram illustrating a sub-room in the space in which audio content is played in accordance with some embodiments of the present disclosure.

FIG. 10 is a diagram illustrating a sub-room in the space in which audio content is played in accordance with some embodiments of the present disclosure.

Referring to FIG. 10, in accordance with some embodiments, audioSubRoom may contain information about Reverberation Time (RT60), RoomIndex, subRoomVolume, subRoomCenterPosition, subRoomAbsorption, subRoomGateSize, and subRoomGateCenter. More specifically, audioSubRoom may contain Reverberation Time (RT60) and RoomIndex as attributes, and contain subRoomVolume, subRoomCenterPosition, subRoomAbsorption, subRoomGateSize, and subRoomGateCenter as sub-elements. Examples of the attributes of audioSubRoom may be shown in Table 7, and examples of the sub-elements of audioSubRoom may be shown in Tables 8 to 10.

TABLE 7

| Attribute | Description | Example | Quantity |
|---|---|---|---|
| RT | Reverberation time | 0.5 | 0 or 1 |
| RoomIndex | Sub room No. | 1 | 1 ... * |

TABLE 8

| Element | Attribute | Description | Units | Example |
|---|---|---|---|---|
| subRoomVolume | width | Width of the room constituting the space | meter | +30.0 |
| | height | Height of the room constituting the space | meter | −15.0 |
| | length | Length of the room constituting the space | meter | 1.0 |
| subRoomCenterPosition | azimuth | Azimuth of the center of the room constituting the space | Degrees | +30.0 |
| | elevation | Elevation angle of the center of the room constituting the space | Degrees | −15.0 |
| | distance | Normalized distance of the center of the room constituting the space | Normalized units (0.0 to 1.0) | 1.0 |
| | X | X-axis of the center of the room constituting the space | Nonnalized units (abs(X) ≤ 1) | −0.3 |
| | Y | Y-axis of the center of the room constituting the space | Normalized units (abs(Y) ≤ 1) | −0.2 |

TABLE 8-continued

| Element | Attribute | Description | Units | Example |
|---|---|---|---|---|
| | Z | Z-axis of the center of the room constituting the space | Normalized units (abs(Z) ≤ 1) | 1.0 |

TABLE 9

| Element | Attribute | Description | Units | Example |
|---|---|---|---|---|
| subRoomAbsorption | floor | Property of the material of the floor constituting the playback space (indicated by sound absorption coefficient) | 0.0 to 1.0 | 0.3 |
| | ceil | Property of the material of the ceiling constituting the playback space (indicated by sound absorption coefficient) | 0.0 to 1.0 | 0.7 |
| | left | Property of the material of the left wall constituting the playback space (indicated by sound absorption coefficient) | 0.0 to 1.0 | 0.5 |
| | right | Property of the material of the right wall constituting the playback space (indicated by sound absorption coefficient) | 0.0 to 1.0 | 0.5 |
| | front | Property of the material of the front wall constituting the playback space (indicated by sound absorption coefficient) | 0.0 to 1.0 | 0.6 |
| | back | Property of the material of the rear wall constituting the playback space (indicated by the sound absorption coefficient) | 0.0 to 1.0 | 0.6 |

TABLE 10

| Element | Attribute | Description | Units | Example |
|---|---|---|---|---|
| subRoomGateSize | height | Height of the room constituting the space | meter | −15.0 |
| | length | Length of the room constituting the space | meter | 1.0 |
| subRoomGateCenter | azimuth | Azimuth of the Gate center | Degrees | +30.0 |
| | elevation | Elevation angle of the Gate center | Degrees | −15.0 |
| | distance | Normalized distance of the Gate center | Normalized units (0.0 to 1.0) | 1.0 |
| | X | X-axis of the Gate center | Nonnalized units (abs(X) ≤ 1) | −0.3 |
| | Y | Y-axis of the Gate center | Normalized units (abs(Y) ≤ 1) | −0.2 |
| | Z | Z-axis of the Gate center | Normalized units (abs(Z) ≤ 1) | 1.0 |

Referring to Table 7, Reverberation Time (RT60) and RoomIndex may be examples of attributes of audioSubRoom. Reverberation Time (RT60) may contain information about the quantity of reverberations in a room, and RoomIndex may contain information about an index for distinguishing rooms included in a (virtual) space in which audio content is played. The index may represent the numbers for the sub-rooms included in the (virtual) space where the audio content is played.

In Table 8, subRoomVolume may represent size information or volume information about a sub-room included in the (virtual) space where the audio content is played. The size information about the sub-room may include, for example, at least one of information about the width of the sub-room, information about the length of the sub-room, and information about the height of the sub-room. In a representative example, the size information about the sub-room may include information about the width of the sub-room, information about the length of the sub-room, and information about the height of the sub-room.

In Table 8, subRoomCenterPosition may represent the position information about the center of a sub-room included in the (virtual) space where audio content is played. The position information about the center of the sub-room may include at least one of information about the azimuth of the center of the sub-room, information about the elevation of the center of the sub-room, and information about the normalized distance of the center of the sub-room, information about the X-axis direction coordinate of the center of the sub-room, information about the Y-axis direction coordinate of the center of the sub-room, and information about the Z-axis direction coordinate of the center of the sub-room. subRoomCenterPosition may be referred to for the purpose of including the sub-room as part of the main room.

subRoomCenterPosition may be classified into information about the X-axis direction coordinate of the center of the sub-room, the Y-axis direction coordinate of the center of the sub-room and information about the Z-axis direction coordinate of the center of the sub-room, which may be presented as meter information, information about the azimuth of the center of the sub-room and information about the elevation of the center of the sub-room, which may be presented as angle information, information about the normalized distance of the center of the sub-room. The meter information may be calculated based on a left corner of the main room, and the angle information may be calculated based on the center position of the main room. In accordance with some embodiments, subRoomCenterPosition may include at least one of the meter information and the angle information about the position of the center of the sub-room.

In one example, the position information about the center of the sub-room may include all of the information about the X-axis direction coordinate of the center of the sub-room, the information about the Y-axis direction coordinate of the center of the sub-room, and the information about the Z-axis direction coordinate of the center of the sub-room, which are meter information about the position of the center of the sub-room.

In another example, the position information about the center of the sub-room may include all of the information about the azimuth of the center of the sub-room and the information about the elevation of the center of the sub-room, which are angle information about the position of the center of the sub-room, and the information about the normalized distance of the center of the sub-room.

In Table 9, subRoomAbsorption may represent property information about a sub-room included in a (virtual) space where audio content is played. The property information about the sub-room may indicate, for example, properties (e.g., sound absorption coefficient) of materials constituting the space in which the audio content is played. Assuming that the environment in which the audio content is produced is a three-dimensional space of a cube (or rectangular parallelepiped), the material properties of the space may be represented based on the sound absorption coefficient information (floor, ceil, left, right, front, and back) about the six faces consisting of the floor, ceiling, and four walls. More specifically, the property information about the sub-room may include at least one of the material property of the floor constituting the sub-room, the material property of the ceiling constituting the sub-room, and the material property of the left wall constituting the sub-room, the material property of the right wall constituting the sub-room, the material property of the front wall constituting the sub-room, and the material property of the back wall constituting the sub-room. In a representative example, the property information about the sub-room may include a material property of the floor constituting the sub-room, a material property of the ceiling constituting the sub-room, and a material property of the left wall constituting the sub-room, a material property of the right wall constituting the sub-room, a material property of the front wall constituting the sub-room, and a material property of the back wall constituting the sub-room.

In one embodiment, the sound absorption coefficient may be determined as a value between 0 and 1. As the sound absorption coefficient approaches 1, it may be determined that the material reflects well. Given the size information about the sub-room defined in Table 8, the reception terminal may generate an optimal Binaural Room Impulse Response (BRIR) at any position and perform smooth rendering based on the generated optimal BRIR.

In Table 10, subRoomGateSize may represent the size information about the gate of the corresponding sub room. The size information about the gate of the sub-room may include at least one of information about the length of the gate of the sub-room and the height of the gate of the sub-room. In a representative example, the size information about the gate of the sub-room may include the information about the length of the gate of the sub-room and the information about the height of the gate of the sub-room. Those skilled in the art will readily understand that the terms "length" and "width" described above may sometimes be used as the same/similar concepts.

In Table 10, subRoomGateCenter may represent position information about the center of the gate of the corresponding sub-room. The position information about the center of the gate of the sub-room may include at least one of information about the elevation of the center of the gate of the sub-room, information about the normalized distance of the center of the gate of the sub-room, information about the X-axis direction coordinate of the center of the gate of the sub-room, information about the Y-axis direction coordinate of the center of the gate of the sub-room, and information about the Z-axis direction coordinate of the center of the gate of the sub-room. In a representative example, the position information about the center of the gate of the sub-room may include information about the elevation of the center of the gate of the sub-room, information about the normalized distance of the center of the gate of the sub-room, information about the X-axis direction coordinate of the center of the gate of the sub-room, information about the Y-axis direction coordinate of the center of the gate of the sub-room, and information about the Z-axis direction coordinate of the center of the gate of the sub-room.

subRoomGateCenter may be classified into information about the X-axis direction coordinate of the center of the gate of a sub-room, Y-axis coordinate of the center of the gate of the sub-room, and information about the Z-axis direction coordinate of the center of the gate of the sub-room, which may be presented as meter information, information about the azimuth of the center of the gate of the sub-room and information about the elevation of the center of the gate of the sub-room, which may be presented as angle information, and information about the normalized distance of the center of the gate of the sub-room. The meter information may be calculated based on the left corner of the main room, and angle information may be calculated based on the center position of the main room. The subRoomGateCenter in accordance with some embodiments may include at least one of the meter information and the angle information about the position of the center of the sub-room.

While audioRoomEnvironment is described as being classified into audioMainRoom and audioSubRoom, embodiment are not limited thereto. In one embodiment, audioRoomEnvironment may be classified based on common elements of audioMainRoom and audioSubRoom. For example, audioRoomEnvironment may not be classified into audioMainRoom and audioSubRoom, but may be directly classified into size information about the space and property information about the space.

Figure 11A:
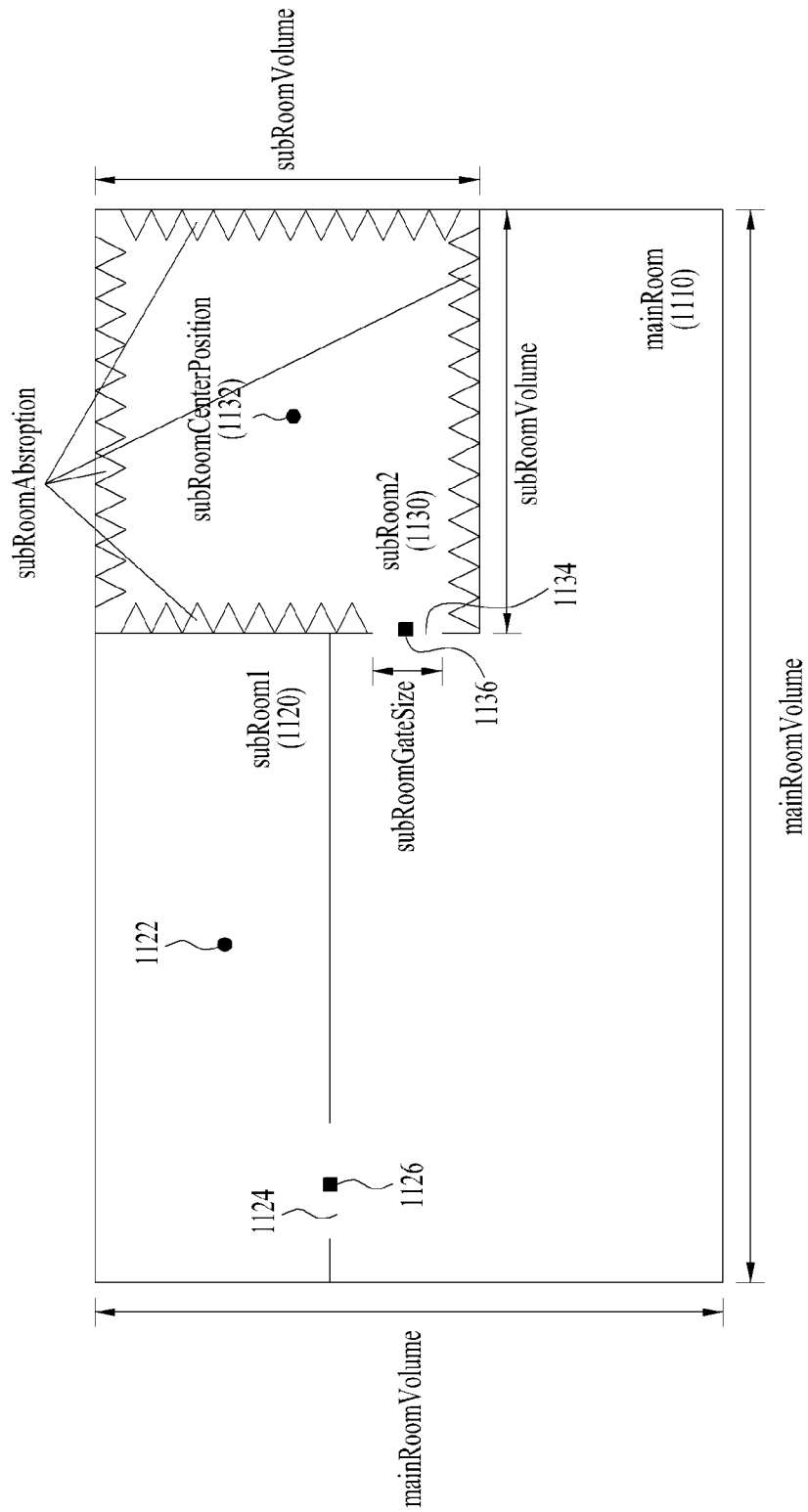
FIGS. 11A and 11B are views illustrating a main room and a sub-room included in a space in which audio content is played in accordance with some embodiments of the present disclosure.
Figure 11B:
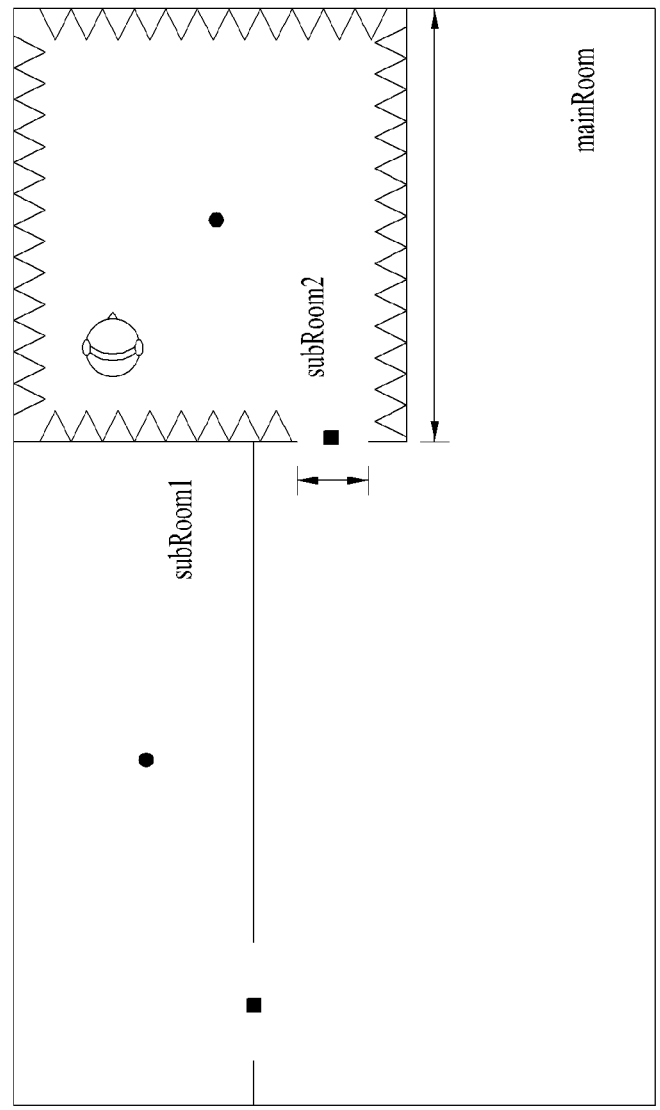

FIGS. 11A and 11B are views illustrating a main room and a sub-room included in a space in which audio content is played in accordance with some embodiments of the present disclosure.

While the (virtual) space in which audio content is played is represented in two dimensions in FIGS. 11A and 11B, this is for convenience of explanation, and those skilled in the art will readily understand that the space is three-dimensionally structured.

In FIG. 11A, two sub-rooms 1120 and 1130 are defined. Accordingly, two audioSubRooms, which are sub-elements of audioRoomEnvironment, may be defined. In each sub-room, a small dot 1122, 1132 shown at the center represents the center 1122, 1132 of the sub-room, and information about the center may be described in subRoomCenterPosition. Referring to subRoom2 in FIG. 11A, it may be seen that the four faces and the floor constituting the space are different from the other spaces (for example, subRoom1), which means that the material of subRoom2 is different from that of the other spaces (for example, subRoom1). As such, information defining the properties of a sub-room may be described in subRoomAbsorption. A small square shown at the lower left portion of subRoom2 represents the center position of the gate of subRoom2. The corresponding position information may be described in subRoomGateCenter. In this regard, the size information about the gate (the size of the gate is indicated by arrows next to the square) may be described in subRoomGateSize. The description of subRoom2 given above may be applied to subRoom1 of FIG. 11A as well. Among the elements of audioSubRoom, the subRoomCenterPosition information and the subRoomVolume information may be used not only for the above-described purposes but also for the purpose of positioning respective subRooms in the main room so as not to overlap each other in constructing a playback environment.

Similar to FIG. 11A, FIG. 11B shows an example in which sub-rooms are included in the main room. On the side of the receiver, the user may move to all spaces including the main room in the actual playback space. The sensor positioned at any point in the actual playback environment of FIG. 11B may detect the position of the user in real time and transmit information about the position of the user to the receiver. In one example, it may be assumed that the user is located in subroom2 as shown in FIG. 11B. The transmitter may transmit not only the size information about the main room but also the size information about the sub-room and the position of the center of the sub-room to the receiver. Here, the position of the user detected by the sensor of the receiver may be interpreted as being in the main room or subroom2. In accordance with some embodiments, the receiver may set the priority of the information about subRoom2 to be higher than the priority of the information about the main room. Thus, the receiver may apply the playback environment information about subRoom2 to the audio signal and transmit the same to the user.

subRoomGateCenter and subRoomGateSize refer to a passage (or position) through which one room is connected to another. Thus, when the sensor detects that the user is located around the subRoomGate-Center, the receiver may process the audio signal, considering all the playback environment information about the respective spaces connected to each other around the corresponding passage, and deliver the processed audio signal to the user.

Figure 12:
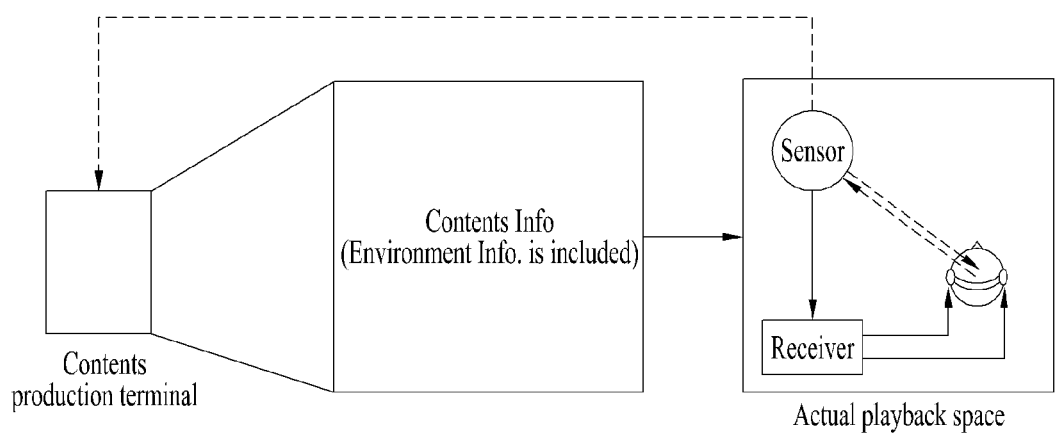
FIG. 12 is a diagram illustrating AR content in accordance with some embodiments of the present disclosure.

FIG. 12 is a diagram illustrating AR content in accordance with some embodiments of the present disclosure.

The aforementioned playback environment information may be applied to a Virtual Reality (VR) 6 DoF environment in accordance with one embodiment, but may also be applied to an Augmented Reality (AR) environment in accordance with some embodiments. In an AR environment in accordance with one embodiment, a user may be located in any space as in the VR 6 DoF environment, and a feature may be moved from one space to another space as shown in FIG. 11B. Since the AR environment is an environment with a new sound source or object added, it may be considered as an extended concept of the VR 6 DoF environment. For example, in the AR environment, any sound source or object may be placed at any position in the space. However, in order to further increase the realism of the object, the property information about the space where the user is located needs to be reflected in the sound source or object. When the space information is given in advance, the sound source may be processed as in the case of producing 6 DoF VR content. On the other hand, when the space information is not given in advance, space property information needs to be obtained in real time. A method for acquiring space property information is, for example, to record a sound source using a speaker and an HOA microphone or another type of microphone at the site, analyze characteristics of the recorded sound source, and reflect the property information in the object or sound source to be disposed in the AR environment.

The playback environment information described above with reference to FIGS. 5 to 11 may be used in the AR environment as well. Alternatively, in order to utilize more specific information for the AR environment, contents related to FIG. 12 may be additionally considered based on FIGS. 9A and 10. Referring to FIG. 12, in the AR environment, the playback environment information described above with reference to FIGS. 5 to 11 may be used. Optionally, the receiver may apply the AR characteristics to the audio content based on information about the actual playback environment of the receiver and the position information about the user, or the contents production terminal (or transmitter) may apply the AR characteristics to the audio content based on the information obtained from the receiver.

Referring to FIG. 12, in some embodiments related to the AR environment, it is necessary to reflect basic information (position, size, etc.) about an object in content that changes over time in real time. Reflecting the change of the basic information about the object in real time may be performed directly by the receiver or, in some cases, by the contents production terminal (or transmitter) based on the position information about the user obtained from the receiver.

The sensor of the receiver in accordance with some embodiments may detect the position of the user and transmit information about the position of the user to the transmitter. The transmitter may reconstruct the metadata about the content based on the position information about the user received from the receiver. The reconstructed metadata may be transmitted to the receiver, and the receiver may perform rendering based on the received metadata. This embodiment may be used to efficiently process AR content when the performance of the receiver is not suitable for an environment in which low latency is to be ensured, or when the performance of the transmitter is superior to that of the receiver.

In an AR environment in which 3D audio content is AR (or augmented reality) content, AR content in accordance with some embodiments may include an AR object. In this case, the audio data transmission apparatus in accordance with some embodiments may transmit the AR object, which is generated based on at least one of information about the position of the audio data reception apparatus, information about the position of a user causes the AR content to be played based on the audio data reception apparatus, and information about the space where the user or the audio data reception apparatus is located, to the audio data reception apparatus.

Figure 13:
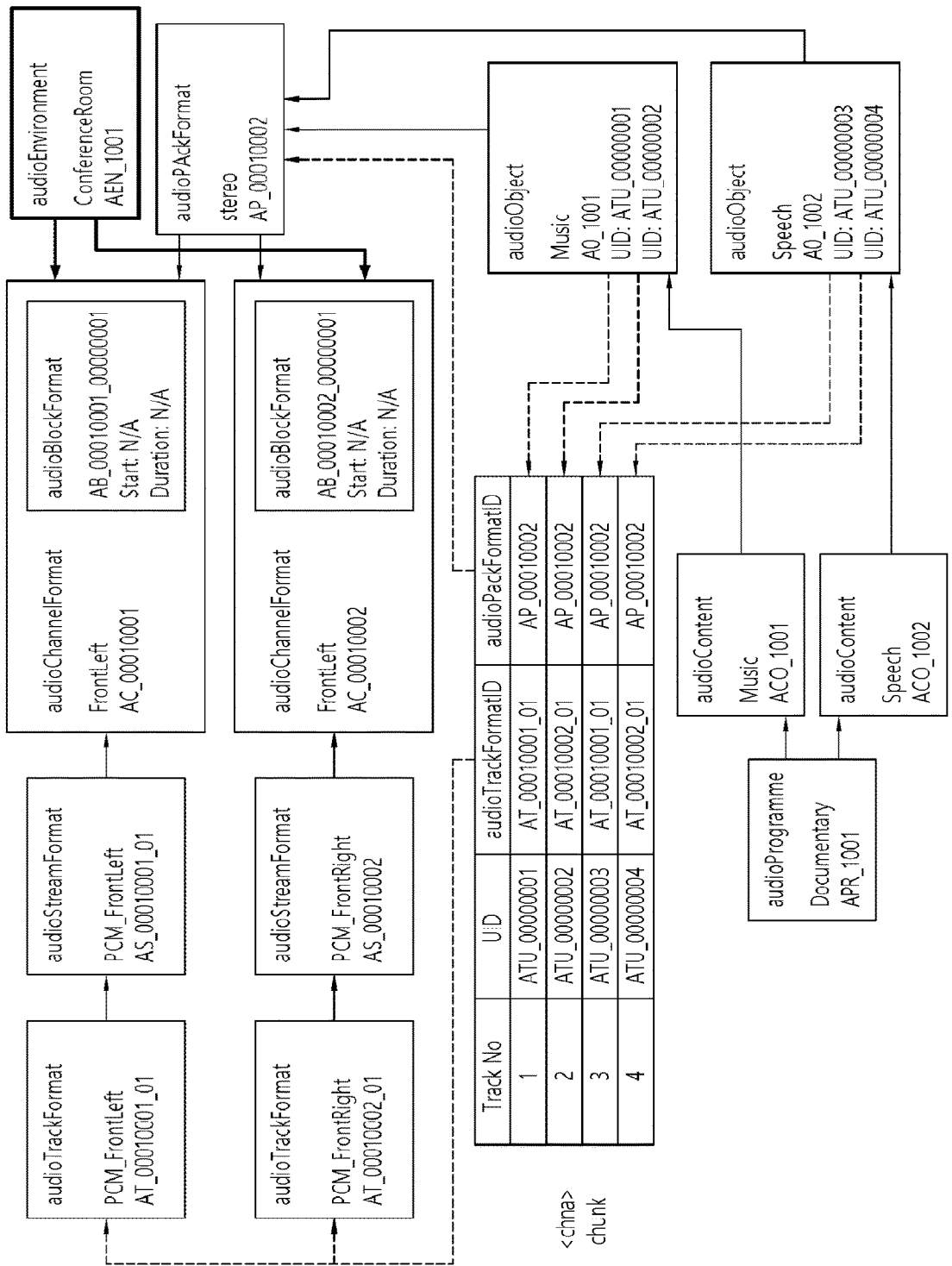
FIG. 13 is a diagram illustrating an audio data model in accordance with some embodiments.

FIG. 13 is a diagram illustrating an audio data model in accordance with some embodiments.

The example shown in FIG. 13 defines the relationship among audioTrackFormat, audioStreamFormat, audioChannelFormat and audioPackFormat for a stereo signal. The stereo signal used in the example of FIG. 13 may be in the form of PCM. Referring to the structure of the audioTrackUID of FIG. 13, it may be seen that there are a total of four tracks. The audioTrackFormat, audioStreamFormat and audioChannelFormat defined in the format part may be defined only for the type of the audio signal. In the example of FIG. 13, four tracks are paired in stereo and referred to by audioTrackFormat. The referenced address may be checked through audioTrackFormatID of audioTrackUID. Since the signals are configured in PCM, audioStreamFormat may refer to audioTrackFormat. audioStreamFormat may be referred to by audioChannelFormat, and two audioChannelFormats may be packed in stereo in audioPackFormat and referred to (the two arrows of audioPackFormat refer to two audioChannelFormats). audioObject may set the relationship among audioContent, audioPackFormat and audioTrackUID. In the example of FIG. 13, two audioObjects refer to audioPack and two audio tracks (audioTrackUID), respectively, and one of audioObjects is designated as "Music" and the other as "Speech". audioContents may refer to audioObject, and audioProgramm may refer to multiple audioConents.

The audioEnvironment proposed in the present disclosure may be set to be directly referred to by audioChannelFormat. In the audioEnvironment, audioEnvironmentID and Name may be set by default. In FIG. 13, they are set to AEN_1001 and ConferencRoom, respectively. Feature information about ConferencRoom may be defined in sub-elements of audioEnvironment. The feature information about ConferencRoom may all be referred to by audioChannelFormat. An example of sample codes related to audioEnvironment is shown in Table 11 below.

TABLE 11

```
<audioEnvironment audioEnvironmentID="AEN_1001"
audioEnvironmentName="ConferenceRoom">
    <audioMainRoom>
        <roomsize coordinate="width">10.0</roomsize>
        <roomsize coordinate="height">5.0</roomsize>
        <roomsize coordinate="length">8.0</roomsize>
    </audioMainRoom>
    <audioMainRoomAbsorption>
        <coefficient value="floor">0.3</coefficient>
        <coefficient value="ceil">0.7</coefficient>
        <coefficient value="left">0.5</coefficient>
        <coefficient value="right">0.5</coefficient>
        <coefficient value="front">0.6</coefficient>
        <coefficient value="back">0.6</coefficient>
    </audioMainRoomAbsorption>
</audioEnvironment>
```

The information declared in the example of FIG. 13 may be transmitted to the reception terminal as metadata information, and the decoder and the renderer of the reception terminal refer to all information including the environment information defined in the metadata to provide the user with 3D audio content of 6 DoF.

Figure 14:
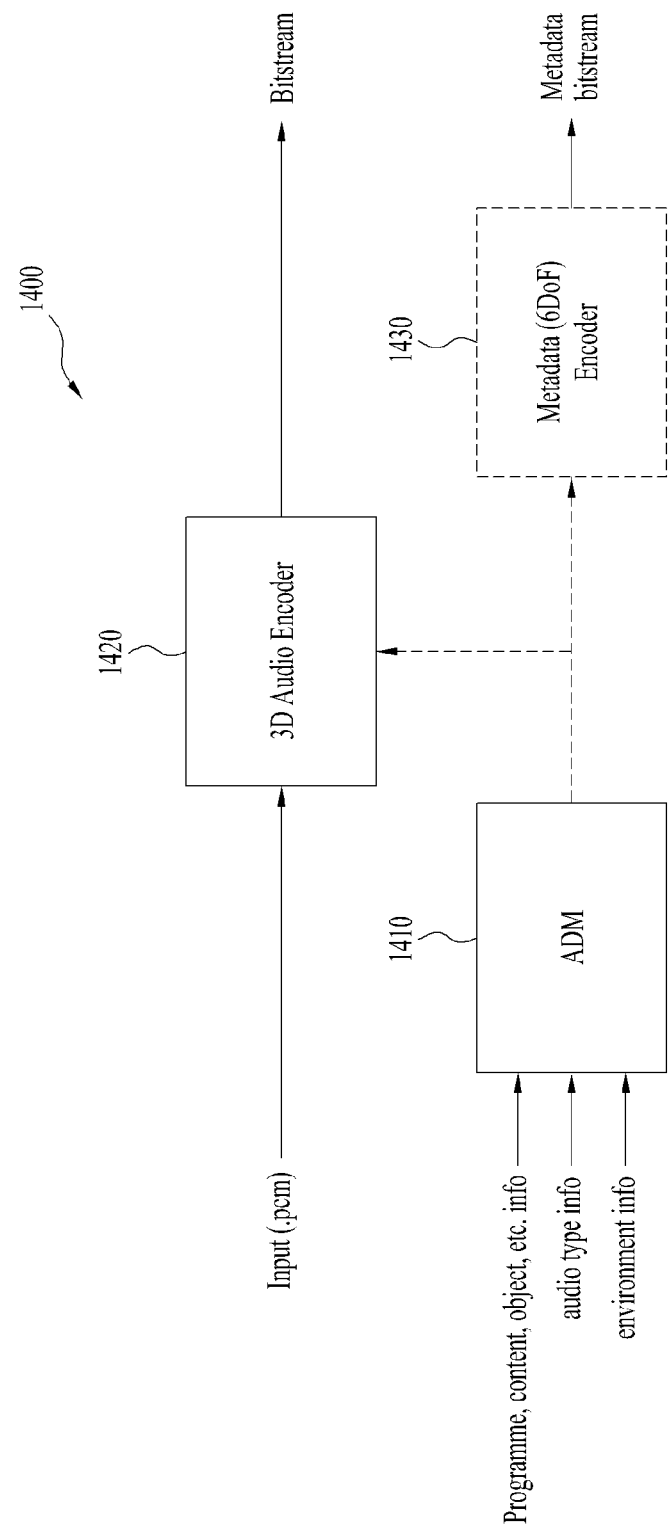
FIG. 14 is a block diagram showing the configuration of an audio data transmission apparatus in accordance with some embodiments.

FIG. 14 is a block diagram showing the configuration of an audio data transmission apparatus in accordance with some embodiments.

As shown in 14, the audio data transmission apparatus 1400 in accordance with some embodiments may include an ADM 1410, a 3D audio encoder 1420, and a metadata (6 DoF) encoder 1430. However, in some cases, not all the elements shown in FIG. 14 may be mandatory elements of the audio data transmission apparatus 1400, and the audio data transmission apparatus 1400 may be implemented by more or fewer elements than the elements shown in FIG. 14.

Based on the audio data transmission apparatus 1400 in accordance with some embodiments, a 3D audio encoding process may be performed considering the ADM. The ADM 1410 may create production environment information about audio content as metadata. Here, the production environment information may include characteristics information about an object type signal.

In one example, some of the metadata generated by the ADM 1410 may be used by the 3D audio encoder 1420 to encode the 3D audio signal, and the remaining metadata (e.g., size information and property information about the playback space) may be encoded through the separate metadata (6 DoF) encoder 1430 to generate a bitstream. However, in some cases, the remaining metadata may be directly included in a bitstream without being encoded because the metadata (6 DoF) encoder 1430 is not a mandatory element of the audio data transmission apparatus 1400.

Figure 15:
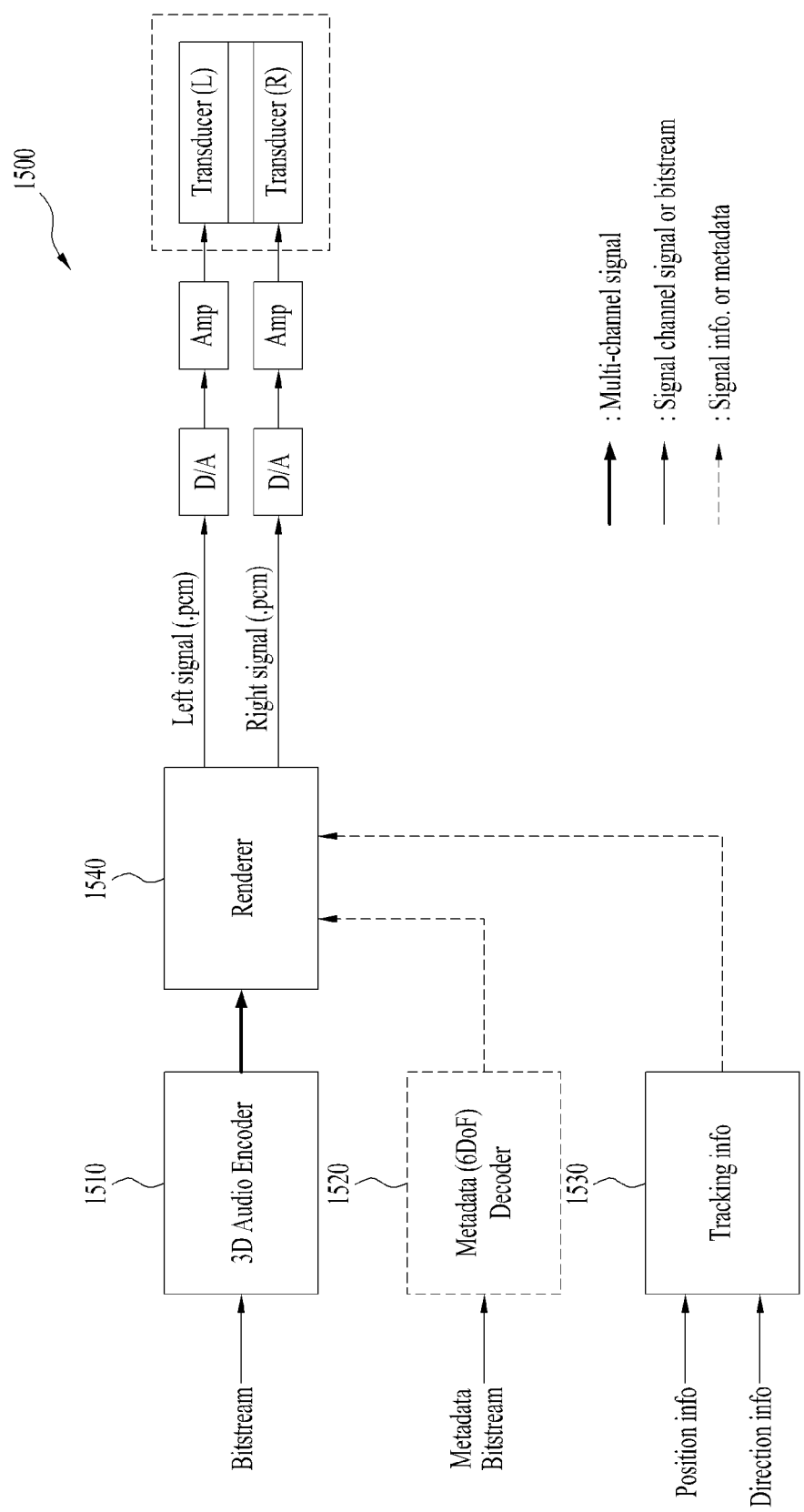
FIG. 15 is a block diagram showing the configuration of an audio data reception apparatus in accordance with some embodiments.

FIG. 15 is a block diagram showing the configuration of an audio data reception apparatus in accordance with some embodiments.

As shown in FIG. 15, the audio data reception apparatus 1500 in accordance with some embodiments may include a 3D audio decoder 1510, a metadata (6 DoF) decoder 1520, tracking info 1530, and a renderer 1540. However, in some cases, not all the elements shown in FIG. 15 may be mandatory elements of the audio data reception apparatus 1500, and the audio data reception apparatus 1500 may be implemented by more or fewer elements than the elements shown in FIG. 15.

The 3D audio decoder 1510 of the audio data reception apparatus 1500 in accordance with some embodiments may receive the bitstream generated through the 3D audio encoder 1420 and decode the audio signal. Then, the metadata (6 DoF) decoder 1520 may extract 6 DoF-related metadata information (e.g., size information and characteristics information of a playback space) from a separately transmitted metadata bitstream, and deliver the same to the renderer 1540 along with user information about the position and direction. The renderer 1540 may perform filtering on the audio signal by invoking or modeling an appropriate filter with reference to the input environment information and the user information (position, direction). Referring to FIG. 15, it may be seen that the stereo (Left signal (.pcm) and Right signal (.pcm)) are output on the assumption of a headphone environment. The two output signals may be played based on the left and right transducers of the headphone through D/A converters and amplifiers (Amp), respectively.

Figure 16:
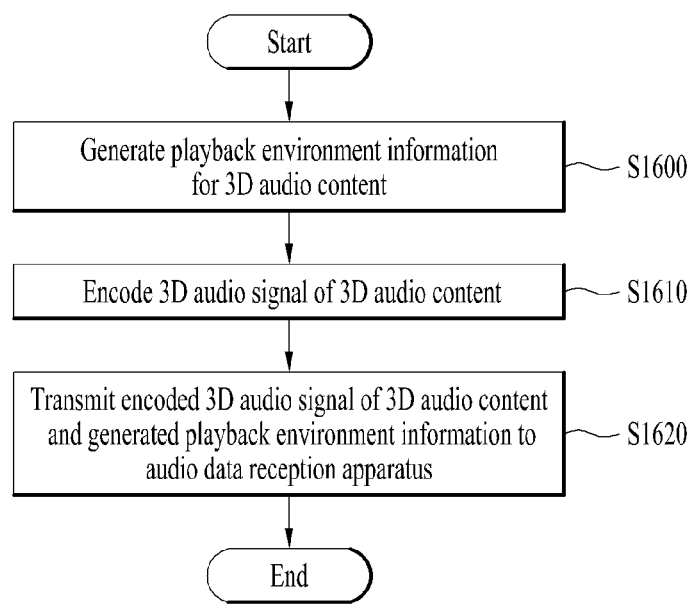
FIG. 16 is a flowchart illustrating operation of the audio data transmission apparatus in accordance with some embodiments.
Figure 17:
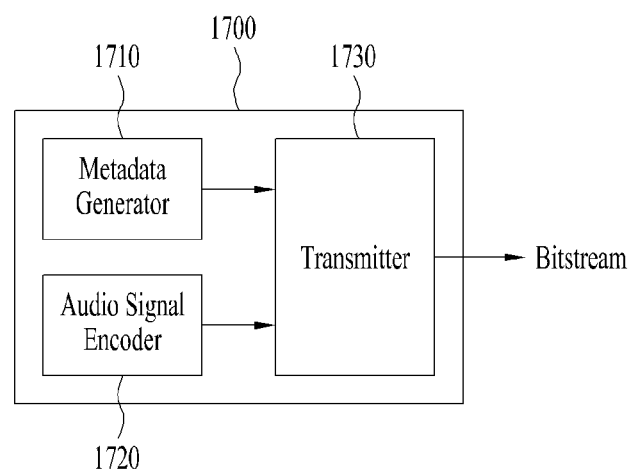
FIG. 17 is a block diagram showing the configuration of an audio data transmission apparatus in accordance with some embodiments.

FIG. 16 is a flowchart illustrating operation of the audio data transmission apparatus in accordance with some embodiments, and FIG. 17 is a block diagram showing the configuration of an audio data transmission apparatus in accordance with some embodiments.

Each operation disclosed in FIG. 16 may be performed by the audio data transmission apparatus 1400 disclosed in FIG. 14 or the audio data transmission apparatus 1700 disclosed in FIG. 17. In one example, operation S1600 of FIG. 16 may be performed by the ADM 1410 of the audio data transmission apparatus 1400 disclosed in FIG. 14 or the metadata generator 1710 of the audio data transmission apparatus 1700 disclosed in FIG. 17. Operation S1610 of FIG. 16 may be performed by the 3D audio encoder 1420 of the audio data transmission apparatus 1400 disclosed in FIG. 14 or the audio signal encoder 1720 of the audio data transmission apparatus 1700 disclosed in FIG. 17. Operation S1620 of FIG. 16 may be performed by the transmitter 1730 of the audio data transmission apparatus 1700 illustrated in FIG. 17. In describing each operation of FIG. 16, description of details described with reference to FIG. 14 will be omitted or simplified.

As illustrated in FIG. 17, the audio data transmission apparatus 1700 in accordance with some embodiments may include a metadata generator 1710, an audio signal encoder 1720, and a transmitter 1730. However, in some cases, not all the elements shown in FIG. 17 may be mandatory elements of the audio data transmission apparatus 1700, and the audio data transmission apparatus 1700 may be implemented by more or fewer elements than the elements shown in FIG. 17.

In the audio data transmission apparatus 1700 in accordance with some embodiments, the metadata generator 1710, the audio signal encoder 1720, and the transmitter 1730 may each be implemented as a separate chip, or at least two elements thereof may be implemented through a single chip.

The audio data transmission apparatus 1700 in accordance with some embodiments may generate playback environment information for 3D audio content (S1600). More specifically, the metadata generator 1710 of the audio data transmission apparatus 1700 may generate playback environment information for the 3D audio content.

In one embodiment, the playback environment information may be metadata based on an Audio Definition Model (ADM) or ADM-extension of the ITU Radiocommunication Sector (ITU-R).

In one embodiment, the ADM or ADM-extension may include information about an audio channel format and the playback environment information, and the playback environment information may refer to information about the audio channel format.

In one embodiment, the 3D audio content may be virtual reality (VR) content for a 3 DoF, 3 DoF+ or 6 DoF environment.

In one embodiment, the playback environment information may include room environment information about a space in which the 3D audio content is played.

In one embodiment, the 3D audio content may be augmented reality (AR) content. The augmented reality content may contain an augmented reality object. In this case, the audio data transmission apparatus 1700 in accordance with some embodiments may transmit the audio data to the audio data reception apparatus. The audio data may be generated based on at least one of information about the position of the audio data reception apparatus, information about the position of a user causing the AR content to be played based on the audio data reception apparatus, and information about the space where the audio data reception apparatus or the user is positioned In one example, the environment information about the space in which the 3D audio content is played may include at least one of information about the size of the space and property information about the space. Examples of the information about the size of the space and the property information about the space are described above in Table 6.

In another example, the environment information about the space in which the 3D audio content is played may include at least one of information about a main room included in the space and information about at least one sub-room included in the space. Examples of the information about the main room are described above in Tables 5 and 6, and examples of the information about the sub-rooms are described above in Tables 7 to 10.

The audio data transmission apparatus 1700 in accordance with some embodiments may encode a 3D audio signal of 3D audio content (S1610). More specifically, the audio signal encoder 1720 of the audio data transmission apparatus 1700 may encode a 3D audio signal of the 3D audio content.

The audio data transmission apparatus 1700 in accordance with some embodiments may transmit the encoded 3D audio signal of the 3D audio content and the generated playback environment information to an audio data reception apparatus (S1620). More specifically, the transmitter 1730 of the audio data transmission apparatus 1700 may transmit the encoded 3D audio signal of the 3D audio content and the generated playback environment information to the audio data reception apparatus.

In accordance with the audio data transmission apparatus 1700 and the method for operating the audio data transmission apparatus 1700 illustrated in FIGS. 16 and 17, the audio data transmission apparatus 1700 may generate playback environment information for 3D audio content (S1600), encode a 3D audio signal of the 3D audio content (S1610), and transmit the encoded 3D audio signal of the 3D audio content and the generated playback environment information to the audio data reception apparatus (S1620). In accordance with operations S1600 to S1620, b transmitting the environment information about the playback space of the 3D audio content to the audio data reception apparatus, the audio data transmission apparatus 1700 may contribute to efficient rendering (or playing) of the 3D audio signal for the 3D audio content (e.g. an audio signal based on VR content for a 6 DoF environment or an audio signal based on AR content for the 6 DoF environment) by the audio data reception apparatus.

Figure 18:
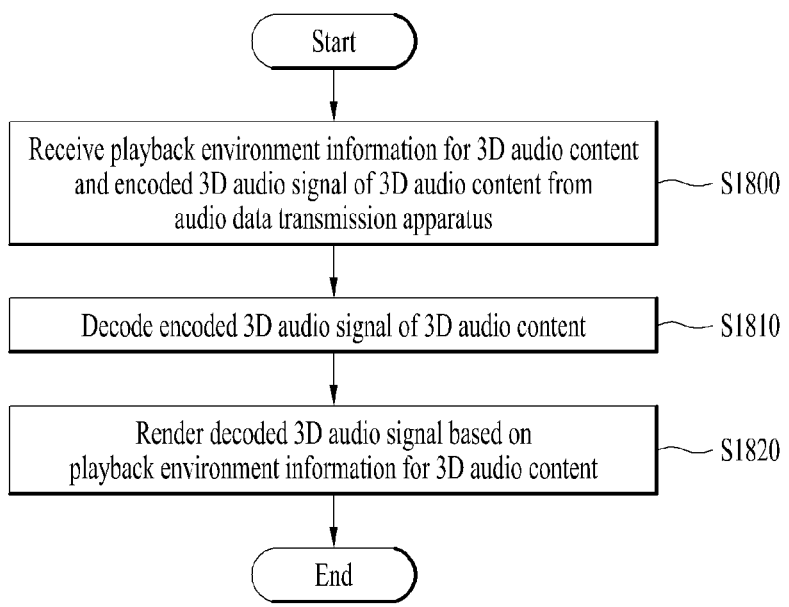
FIG. 18 is a flowchart illustrating operation of an audio data reception apparatus in accordance with some embodiments.
Figure 19:
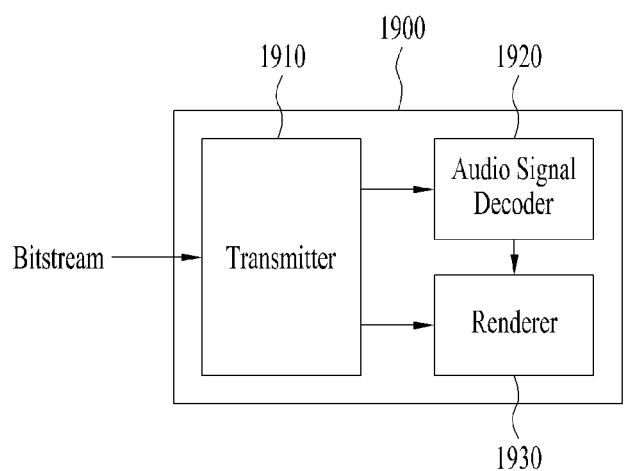
FIG. 19 is a block diagram illustrating the configuration of an audio data reception apparatus in accordance with some embodiments.

FIG. 18 is a flowchart illustrating operation of an audio data reception apparatus in accordance with some embodiments, and FIG. 19 is a block diagram illustrating the configuration of an audio data reception apparatus in accordance with some embodiments.

Each operation disclosed in FIG. 18 may be performed by the audio data reception apparatus 1500 disclosed in FIG. 15 or the audio data reception apparatus 1900 disclosed in FIG. 19. In one example, operation S1800 of FIG. 18 may be performed by the 3D audio decoder 1510 or the metadata decoder 1520 of the audio data reception apparatus 1500 disclosed in FIG. 15, or the receiver 1910 of the audio data reception apparatus 1900 disclosed in FIG. 19, and operation S1810 of FIG. 18 may be performed by the 3D audio decoder 1510 of the audio data reception apparatus 1500 disclosed in FIG. 15 or the audio signal decoder 1920 of the audio data reception apparatus 1900 disclosed in FIG. 19. Operation S1820 of FIG. 18 may be performed by the renderer 1540 of the audio data reception apparatus 1500 disclosed in FIG. 15 or the renderer 1930 of the audio data reception apparatus 1900 disclosed in FIG. 19. In describing each operation of FIG. 18, description of details described with reference to FIG. 15 will be omitted or simplified.

In addition, the audio data transmission apparatus 1700 disclosed in FIG. 17 and the audio data reception apparatus 1900 disclosed in FIG. 19 are closely related to each other because they transmit and receive audio data to and from each other. Accordingly, in describing FIGS. 18 and 19, description of details described with reference to FIGS. 16 and 17 will be omitted or simplified.

As illustrated in FIG. 19, the audio data reception apparatus 1900 in accordance with some embodiments may include a receiver 1910, an audio signal decoder 1920, and a renderer 1930. However, in some cases, not all the elements shown in FIG. 19 may be mandatory elements of the audio data reception apparatus 1900, and the audio data reception apparatus 1900 may be implemented by more or fewer elements than the elements shown in FIG. 19.

In the audio data reception apparatus 1900 in accordance with some embodiments, the receiver 1910, the audio signal decoder 1920 and the renderer 1930 may each be implemented as a separate chip, or at least two elements thereof may be implemented through a single chip.

The audio data reception apparatus 1900 in accordance with some embodiments may receive playback environment information for 3D audio content and an encoded 3D audio signal of the 3D audio content from the audio data transmission apparatus 1700 (S1800). More specifically, the receiver 1910 of the audio data reception apparatus 1900 may receive the playback environment information for the 3D audio content and the encoded 3D audio signal of the 3D audio content from the audio data transmission apparatus 1700.

In one embodiment, the playback environment information may include room environment information about a space in which the 3D audio content is played.

In one example, the environment information about the space in which the 3D audio content is played may include at least one of information about the size of the space and property information about the space. Examples of the information about the size of the space and the property information about the space are described above in Table 6.

In another example, the environment information about the space in which the 3D audio content is played may include at least one of information about a main room included in the space and information about at least one sub-room included in the space. Examples of the information about the main room are described above in Tables 5 and 6, and examples of the information about the sub-rooms are described above in Tables 7 to 10.

The audio data reception apparatus 1900 in accordance with some embodiments may decode the encoded 3D audio signal (S1810). More specifically, the audio signal decoder 1920 of the audio data reception apparatus 1900 may decode the encoded 3D audio signal.

The audio data reception apparatus 1900 in accordance with some embodiments may render the decoded 3D audio signal based on the playback environment information for the 3D audio content (S1820). More specifically, the renderer 1930 of the audio data reception apparatus 1900 may render the decoded 3D audio signal based on the playback environment information for the 3D audio content.

In accordance with the audio data reception apparatus 1900 and the method for operating the audio data reception apparatus 1900 disclosed in FIGS. 18 and 19, the audio data reception apparatus 1900 may receive environment information for 3D audio content and an encoded 3D audio signal of the 3D audio content from the audio data transmission apparatus 1700 (S1800), decode the encoded 3D audio signal (S1810), and render the playback environment information for the 3D audio content (S1820). In accordance with operations S1800 to S1820, the audio data reception apparatus 1900 may receive the environment information about the playback space for the 3D audio content from the audio data transmission apparatus 1700, thereby efficiently rendering (or playing) the 3D audio signal for the 3D audio content (e.g., an audio signal based on VR content for a 6 DoF environment or an audio signal based on AR content for the 6 DoF environment.

The above-described modules may be omitted or replaced by other modules configured to perform similar/same operations in accordance with embodiments.

Each of the above-described parts, modules, or units may be a processor or hardware part that executes successive procedures stored in a memory (or storage unit). Each of the steps described in the above-described embodiment may be performed by processors or hardware parts. Each module/block/unit described in the above-described embodiment may operate as a hardware element/processor. In addition, the methods described in the present disclosure may be executed as code. The code may be written in a recoding medium readable by a processor, and thus may be read by the processor provided by the apparatus.

While the methods in the above-described embodiment are described based on a flowchart of a series of steps or blocks, the present disclosure is not limited to the order of the steps. Some steps may take place in a different order or simultaneously. It will be understood by those skilled in the art that the steps shown in the flowchart are not exclusive, and other steps may be included or one or more of the steps in the flowchart may be deleted within the scope of the present disclosure.

When embodiments of the present disclosure are implemented in software, the above-described method may be implemented as a module (process, function, etc.) configured to perform the above-described functions. The module may be stored in a memory and may be executed by a processor. The memory may be inside or outside the processor, and may be connected to the processor by various well-known means. The processor may include application-specific integrated circuits (ASICs), other chipsets, logic circuits, and/or data processing devices. The memory may include a read-only memory (ROM), a random access memory (RAM), a flash memory, a memory card, a storage medium, and/or other storage devices.

The internal elements of the above-described apparatuses may be processors that execute successive processes stored in the memory, or may be hardware elements composed of other hardware. These elements may be arranged inside/outside the device.

The above-described modules may be omitted or replaced by other modules configured to perform similar/same operations in accordance with embodiments.

Each of the above-described parts, modules, or units may be a processor or hardware part that executes successive procedures stored in a memory (or storage unit). Each of the steps described in the above-described embodiments may be performed by processors or hardware parts. Each module/block/unit described in the above-described embodiment may operate as a hardware element/processor. In addition, the methods described in the present disclosure may be executed as code. The code may be written in a recoding medium readable by a processor, and thus may be read by the processor provided by the apparatus.

While the methods in the above-described embodiment are described based on a flowchart of a series of steps or blocks, the present disclosure is not limited to the order of the steps. Some steps may take place in a different order or simultaneously. It will be understood by those skilled in the art that the steps shown in the flowchart are not exclusive, and other steps may be included or one or more of the steps in the flowchart may be deleted within the scope of the present disclosure.

When embodiments of the present disclosure are implemented in software, the above-described method may be implemented as a module (process, function, etc.) configured to perform the above-described functions. The module may be stored in a memory and may be executed by a processor. The memory may be inside or outside the processor, and may be connected to the processor by various well-known means. The processor may include application-specific integrated circuits (ASICs), other chipsets, logic circuits, and/or data processing devices. The memory may include a read-only memory (ROM), a random access memory (RAM), a flash memory, a memory card, a storage medium, and/or other storage devices.

The invention claimed is:

1. A method for transmitting audio data by an audio data transmission apparatus, the method comprising:
generating metadata, wherein the generated metadata includes playback environment information for three-dimensional (3D) audio content;
encoding a 3D audio signal of the 3D audio content; and
transmitting the encoded 3D audio signal of the 3D audio content and the generated metadata including the playback environment information to an audio data reception apparatus,
wherein the playback environment information comprises environment information about a room for playing the 3D audio content,
wherein the environment information about the room for playing the 3D audio content comprises at least one of information about a main room included in the room or information about at least one sub-room included in the room,
wherein a size of the main room is greater than a size of each of the at least one sub-room.

2. The method of claim 1, wherein the environment information about the room for playing the 3D audio content comprises at least one of size information about the room or property information about the room.

3. The method of claim 2, wherein the size information about the room comprises at least one of information about a width of the room, information about a length of the room, or information about a height of the room.

4. The method of claim 2, wherein the property information about the room comprises at least one of a material property of a floor constituting the room, a material property of a ceiling constituting the room, a material property of a left wall constituting the room, and a material property of a right wall constituting the room, a material property of a front wall constituting the room, or a material property of a back wall constituting the room.

5. The method of claim 1, wherein the information about the main room comprises at least one of size information about the main room or property information about the main room.

6. The method of claim 5, wherein the size information about the main room comprises at least one of information about a width of the main room, information about a length of the main room, or information about a height of the main room.

7. The method of claim 5, wherein the property information about the main room comprises at least one of a material property of a floor constituting the main room, a material property of a ceiling constituting the main room, a material property of a left wall constituting the main room, and a material property of a right wall constituting the main room, a material property of a front wall constituting the main room, or a material property of a rear wall constituting the main room.

8. The method of claim 1, wherein the information about the at least one sub-room comprises information about a first sub-room included in the room,
wherein the information about the first sub-room comprises at least one of size information about the first sub-room, position information about a center of the first sub-room, property information about the first sub-room, size information about a gate of the first sub-room, or position information about a center of the gate of the first sub-room.

9. The method of claim 8, wherein the size information about the first sub-room comprises at least one of information about a width of the first sub-room, information about a length of the first sub-room, or information about a height of the first sub-room.

10. The method of claim 8, wherein the position information about the center of the first sub-room comprises at least one of information about an azimuth of the center of the first sub-room, information about an elevation of the center of the first sub-room, information about a normalized distance of the center of the first sub-room, information about an X-axis direction coordinate of the center of the first sub-room, information about a Y-axis direction coordinate of the center of the first sub-room, or information about a Z-axis direction coordinate of the center of the first sub-room.

11. The method of claim 8, wherein the property information about the first sub-room comprises at least one of a material property of a floor constituting the first sub-room, a material property of a ceiling constituting the first sub-room, a material property of a left wall constituting the first sub-room, a material property of a right wall constituting the first sub-room, a material property of a front wall constituting the first sub-room, or a material property of a rear wall constituting the first sub-room.

12. The method of claim 8, wherein the size information about the gate of the first sub-room comprises at least one of information about a length of the gate of the first sub-room or information about a height of the gate of the first sub-room.

13. The method of claim 8, wherein the position information about the center of the gate of the first sub-room comprises at least one of information about an azimuth of the center of the gate of the first sub-room, information about an elevation of the center of the gate of the first sub-room, and information about a normalized distance of the center of the gate of the first sub-room, information about an X-axis direction coordinate of the center of the gate of the first sub-room, information about a Y-axis direction coordinate of the center of the gate of the first sub-room, or information about a Z-axis coordinate of the center of the gate of the first sub-room.

14. The method of claim 1, wherein the 3D audio content is Virtual Reality (VR) content.

15. The method of claim 1, wherein the 3D audio content is Augmented Reality (AR) content,
wherein the AR content contains an AR object,
the method further comprising:
transmitting the AR object to the audio data reception apparatus, the AR object being generated based on at least one of information about a position of the audio data reception apparatus, information about a position of a user to play the AR content based on the audio data reception apparatus, or information about a room in which the user or the audio data reception apparatus is positioned.

16. The method of claim 15, wherein the ADM or ADM-extension contains information about an audio channel format and the playback environment information, wherein the playback environment information refers to the information about the audio channel format.

17. The method of claim 1, wherein the playback environment information is metadata based on an Audio Definition Model (ADM) or ADM-extension of ITU Radiocommunication Sector (ITU-R).

18. An audio data transmission apparatus for transmitting audio data, comprising:
- a metadata generator configured to generate metadata, wherein the generated metadata includes playback environment information for three-dimensional (3D) audio content;
- an audio signal encoder configured to encode a 3D audio signal of the 3D audio content; and
- a transmitter configured to transmit the encoded 3D audio signal of the 3D audio content and the generated metadata including the playback environment information to an audio data reception apparatus,
- wherein the playback environment information comprises room environment information for playing the 3D audio content,
- wherein the environment information about the room for playing the 3D audio content comprises at least one of information about a main room included in the room or information about at least one sub-room included in the room,
- wherein a size of the main room is greater than a size of each of the at least one sub-room.

19. A method for receiving audio data by an audio data reception apparatus, the method comprising:
- receiving metadata including playback environment information for three-dimensional (3D) audio content and an encoded 3D audio signal of the 3D audio content from an audio data transmission apparatus;
- decoding the encoded 3D audio signal; and
- rendering the decoded 3D audio signal based on the metadata including the playback environment information for the 3D audio content,
- wherein the playback environment information comprises room environment information for playing the 3D audio content,
- wherein the environment information about the room for playing the 3D audio content comprises at least one of information about a main room included in the room or information about at least one sub-room included in the room,
- wherein a size of the main room is greater than a size of each of the at least one sub-room.

* * * * *